(12) United States Patent
Matsumoto et al.

(10) Patent No.: US 7,058,494 B2
(45) Date of Patent: Jun. 6, 2006

(54) VEHICLE DYNAMICS CONTROL APPARATUS

(75) Inventors: Shinji Matsumoto, Kanagawa (JP); Genpei Naito, Yokohama (JP); Satoshi Tange, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/735,778

(22) Filed: Dec. 16, 2003

(65) Prior Publication Data

US 2004/0153228 A1   Aug. 5, 2004

(30) Foreign Application Priority Data

Jan. 31, 2003  (JP) .............................. 2003-024912

(51) Int. Cl.
   *B60W 40/12*   (2006.01)
   *B60T 8/24*    (2006.01)

(52) U.S. Cl. .......................... 701/41; 701/70; 303/140

(58) Field of Classification Search ................. 701/41, 701/70, 81, 72, 75, 42, 48, 200, 205; 303/140, 303/146; 180/410, 446, 422; 280/5.51, 280/5.508; 318/586, 587
   See application file for complete search history.

(56) References Cited

U.S. PATENT DOCUMENTS

| | | | |
|---|---|---|---|
| 5,483,453 A * | 1/1996 | Uemura et al. ................ 701/23 |
| 5,508,929 A * | 4/1996 | Harada ......................... 701/48 |
| 5,615,117 A * | 3/1997 | Serizawa ...................... 701/42 |
| 6,256,561 B1 | 7/2001 | Asanuma | |
| 6,370,474 B1 * | 4/2002 | Hiwatashi et al. .......... 701/300 |
| 6,409,287 B1 * | 6/2002 | Leach et al. ................. 303/146 |
| 6,442,469 B1 * | 8/2002 | Matsuno ....................... 701/70 |
| 6,702,717 B1 * | 3/2004 | Murakami ................... 477/182 |

FOREIGN PATENT DOCUMENTS

| | | |
|---|---|---|
| DE | 199 48 913 A1 | 5/2000 |
| EP | 1 075 992 A2 | 2/2001 |
| EP | 1 197 410 A2 | 4/2002 |
| JP | 11-96497 A | 4/1999 |
| JP | 11-160205 A | 6/1999 |
| JP | 2000-33860 A | 2/2000 |

* cited by examiner

*Primary Examiner*—Dalena Tran
(74) *Attorney, Agent, or Firm*—Foley & Lardner LLP

(57) ABSTRACT

In a vehicle dynamics control apparatus enabling vehicle dynamics control and lane deviation prevention control, a processor of a control unit is programmed for determining a driving stability including a vehicle driveability and a vehicle stability, based on at least a steer angle, and for executing the vehicle dynamics control by producing a yaw moment corresponding to a controlled variable of the vehicle dynamics control when the driving stability is deteriorated, and for executing the lane deviation prevention control by producing a yaw moment corresponding to a controlled variable of the lane deviation prevention control when there is a possibility of lane deviation. The processor is further programmed for softening a criterion, which is used to determine the driving stability, based on the controlled variable of the lane deviation prevention control, only when the vehicle dynamics control is inoperative.

24 Claims, 8 Drawing Sheets

FIG.6B LANE-DEVIATION ESTIMATE |XS|

FIG.6C STEER ANGLE δ

FIG.6D FINAL DESIRED YAW RATE Φrh AND ACTUAL YAW RATE φ'

FIG.6E DESIRED WHEEL-BRAKE CYLINDER PRESSURE DIFFERENCE ΔPsF FOR LDP CONTROL

LESS YAW-RATE DEVIATION
⇒ WITH NO MALFUNCTION OF VDC CONTROL SYSTEM
⇒ STABLE LDP CONTROL SYSTEM

VEHICLE DYNAMICS CONTROL APPARATUS

TECHNICAL FIELD

The present invention relates to a vehicle dynamics control apparatus for an automotive vehicle having a vehicle dynamics control (VDC) function engaged to control dynamic behavior of the vehicle when the driving stability (vehicle driveability and stability is deteriorated and a lane deviation prevention (LDP) function engaged to prevent the vehicle (the host vehicle) from deviating from the driving lane by correcting the host vehicle's course in a direction that the lane deviation is avoided when there is a possibility of the host vehicle's lane deviation.

BACKGROUND ART

On automotive vehicles having both the vehicle dynamics control (VDC) function and lane deviation prevention (LDP) function, generally, there are two types of lane deviation prevention control, namely, an LDP control system using a steering actuator and an LDP control system using a braking force actuator. In the steering-actuator equipped LDP control system, lane deviation is prevented by producing a yaw moment or a yawing moment by controlling the steering actuator depending on a host vehicle's lateral displacement or a host vehicle's lateral deviation from a central axis (a reference axis) of the current host vehicle's driving lane. One such steering-actuator equipped LDP control system has been disclosed in Japanese Patent Provisional Publication No. 11-96497 (hereinafter is referred to as JP11-96497).

On the other hand, in the braking-force-actuator equipped LDP control system, lane deviation is prevented by producing a yaw moment by controlling the braking force actuator, such as an ABS-system hydraulic modulator, depending on a host vehicle's lateral deviation from a central axis (a reference axis) of the current host vehicle's driving lane. Usually, in order to produce the yaw moment for lane deviation avoidance, braking forces are applied to the road wheels opposite to the direction that the lane deviation occurs. One such braking-force-actuator equipped LDP control system has been disclosed in Japanese Patent Provisional Publication No. 2000-33860 (hereinafter is referred to as JP2000-33860).

In case of automotive vehicles with steering-actuator equipped LDP control systems as disclosed in JP11-96497, there are several demerits described hereunder.

Assuming that a manual steering operation is made by the driver in the direction opposite to the direction of automatic steering operation, a steering torque created automatically must be overcome by a steering torque manually created, and thus a great driver's steering effort may be required. Suppose that the steering torque manually created by the driver can easily overcome the maximum steering torque created automatically by means of the steering actuator. Such setting of the maximum steering torque automatically created means a lack of steering torque created automatically, that is, a slow automatic-steering response, in other words, a deteriorated lane deviation prevention control performance. Also, assuming that the automatic steering operation is more rapidly made with a quick automatic-steering response when an electronic control unit determines that there is a possibility of the host vehicle's lane deviation, the driver, which takes a grip on the steering wheel, may feel uncomfortable. The quick automatic-steering response also means a large-sized steering actuator. Additionally, the use of a steering actuator (an additional component part) or the large-sized steering actuator means increased manufacturing costs.

On the contrary, in case of automotive vehicles with braking-force-actuator equipped LDP control systems as disclosed in JP2000-33860, a hydraulic modulator included in the existing ABS system can also serve as a braking force actuator for lane deviation prevention (LDP) control system. For instance, assuming that a hydraulic modulator incorporated in a four-channel ABS anti-lock brake system is used as a braking force actuator for LDP control, braking forces of four road wheels can be controlled independently of each other even when the driver produces the steering torque manually. Thus, the automotive vehicle with the braking-force-actuator equipped LDP control system as disclosed in JP2000-33860 avoids the demerits as discussed above in reference to the steering-actuator equipped LDP control system disclosed in JP11-96497.

SUMMARY OF THE INVENTION

However, the system disclosed in JP2000-33860 never takes into account a mutual balance or control interference between the vehicle dynamics control, and the lane deviation prevention control. As described previously, the LDP control system controls a yaw moment that is a controlled variable for LDP control.

In the VDC control system, vehicle dynamic behavior, such as a yaw rate and a sideslip angle, is controlled by producing a yaw moment in a direction that the driving stability is enhanced when the driving stability is deteriorated, so that a turning level of the vehicle is reduced to achieve a transition from an unstable driving state (a poor driving stability) approximate to the vehicle's limit drivability to a stable driving state (a good driving stability). In the same manner as the LDP control, the yaw moment is a controlled variable for VDC control.

During the LDP control mode, a yaw moment or a yaw rate is produced without any driver's manual steering operation so that the lane deviation is prevented by way of a left-and-right braking-force difference. On the other hand, the VDC function is engaged (enabled) depending on a deviation between an actual yaw rate, which is exerted on the vehicle, and a desired yaw rate, which is calculated or estimated based on the magnitude of steered input and vehicle speed. If a yaw moment or a yaw rate is produced and changed owing to LDP control without any steering operation, there is a possibility that the actual yaw rate deviates from the desired yaw rate calculated for VDC control and thus the VDC function is undesirably erroneously engaged (see FIGS. 7A–7E, in particular FIGS. 7D and 7E). Therefore, it would be desirable to avoid such an undesirable engagement or malfunction for VDC control, occurring due to the yaw moment (yaw rate) produced and changed owing to LDP control.

Accordingly, it is an object of the invention to provide a vehicle dynamics control apparatus for an automotive vehicle having a VDC function and an LDP function, which is capable of avoiding such an undesirable engagement or malfunction for VDC control, occurring due to a yaw moment (yaw rate) produced and changed owing to LDP control.

In order to accomplish the aforementioned and other objects of the present invention, a vehicle dynamics control apparatus comprises sensors that detect at least a turning condition and a driving condition of a host vehicle, an actuator that produces a yaw moment acting on the host vehicle, and a control unit configured to be electronically connected to the sensors and the actuator, for enabling vehicle dynamics control and lane deviation prevention control, the control unit comprising a driving stability decision section that determines a driving stability including a vehicle driveability and a vehicle stability, based on at least the turning condition, a yawing-motion control section that controls a yawing motion of the host vehicle by producing the yaw moment corresponding to a final desired yaw moment and acting in a direction that improves the driving stability when the driving stability is deteriorated, the final desired yaw moment being determined to be equal to a controlled variable of the lane deviation prevention control when the vehicle dynamics control is inoperative and determined to be equal to a controlled variable of the vehicle dynamics control when the vehicle dynamics control is operative, a lane deviation prevention section that determines, based on the driving condition, a lane-deviation tendency of the host vehicle from a driving lane, and executes the lane deviation prevention control by producing the yaw moment corresponding to the controlled variable of the lane deviation prevention control and acting in a direction that lane deviation is prevented; and a driving stability decision compensation section that compensates for a decision of the driving stability, based on the controlled variable of the lane deviation prevention control.

According to another aspect of the invention, a vehicle dynamics control apparatus comprises sensors that detect at least an actual yaw rate, a yaw angle, a host vehicle speed, and a steer angle, an actuator that produces a yaw moment acting on the host vehicle, and a control unit configured to be electronically connected to the sensors and the actuator, for enabling vehicle dynamics control and lane deviation prevention control, the control unit comprising a desired yaw rate calculation section that calculates a desired yaw rate based on at least the host vehicle speed and the steer angle, a driving stability decision section that determines a driving stability including a vehicle driveability and a vehicle stability, based on at least a yaw-rate deviation between the actual yaw rate and a final desired yaw rate, a yawing-motion control section that controls a yawing motion of the host vehicle by producing the yaw moment corresponding to a final desired yaw moment and acting in a direction that improves the driving stability when the driving stability is deteriorated, the final desired yaw moment being determined to be equal to a controlled variable of the lane deviation prevention control when the vehicle dynamics control is inoperative and determined to be equal to a controlled variable of the vehicle dynamics control when the vehicle dynamics control is operative, a lane deviation prevention section that determines, based on at least the host vehicle speed and the yaw angle, a lane-deviation tendency of the host vehicle from a driving lane, and executes the lane deviation prevention control by producing the yaw moment corresponding to the controlled variable of the lane deviation prevention control and acting in a direction that lane deviation is prevented, and a desired yaw rate compensation section that compensates for the desired yaw rate based on the controlled variable of the lane deviation prevention control to produce the final desired yaw rate.

According to a further aspect of the invention, a vehicle dynamics control apparatus comprises sensors that detect at least an actual yaw rate, a yaw angle, a host vehicle speed, and a steer angle, an actuator that produces a yaw moment acting on the host vehicle, and a control unit configured to be electronically connected to the sensors and the actuator, for enabling vehicle dynamics control and lane deviation prevention control, the control unit comprising a lane deviation prevention section that determines, based on at least the host vehicle speed and the yaw angle, a lane-deviation tendency of the host vehicle from a driving lane, and executes the lane deviation prevention control by producing the yaw moment corresponding to a controlled variable of the lane deviation prevention control and acting in a direction that lane deviation is prevented, an equivalent steer angle calculation section that calculates an equivalent steer angle equivalent to the controlled variable of the lane deviation prevention control, a steer-angle correction value calculation section that calculates a steer-angle correction value by adding the equivalent steer angle to the steer angle, a desired yaw rate calculation section that calculates a final desired yaw rate based on the steer-angle correction value, a driving stability decision section that determines a driving stability including a vehicle driveability and a vehicle stability, based on at least a yaw-rate deviation between the actual yaw rate and the final desired yaw rate, and a yawing-motion control section that controls a yawing motion of the host vehicle by producing the yaw moment corresponding to a final desired yaw moment and acting in a direction that improves the driving stability when the driving stability is deteriorated, the final desired yaw moment being determined to be equal to the controlled variable of the lane deviation prevention control when the vehicle dynamics control is inoperative and determined to be equal to a controlled variable of the vehicle dynamics control when the vehicle dynamics control is operative.

According to a still further aspect of the invention, a vehicle dynamics control apparatus comprises sensors that detect at least a turning condition and a driving condition of a host vehicle, an actuator that produces a yaw moment acting on the host vehicle, a control unit configured to be electronically connected to the sensors and the actuator, for enabling vehicle dynamics control and lane deviation prevention control, the control unit comprising a processor programmed to perform the following, determining a driving stability including a vehicle driveability and a vehicle stability, based on at least the turning condition, executing the vehicle dynamics control by producing the yaw moment corresponding to a controlled variable of the vehicle dynamics control that improves the driving stability when the driving stability is deteriorated, executing the lane deviation prevention control by producing the yaw moment corresponding to a controlled variable of the lane deviation prevention control that prevents lane deviation, and softening a criterion, which is used to determine the driving stability, based on the controlled variable of the lane deviation prevention control, only when the vehicle dynamics control is inoperative.

According to another aspect of the invention, a method of balancing a vehicle dynamics control system and a lane deviation prevention control system, the method comprises detecting at least a turning condition and a driving condition of a host vehicle, determining a driving stability including a vehicle driveability and a vehicle stability, based on at least the turning condition, controlling a yawing motion of the host vehicle by producing a yaw moment corresponding to a final desired yaw moment and acting on the host vehicle in a direction that improves the driving stability when the driving stability is deteriorated, selecting a controlled variable of lane deviation prevention control as the final desired yaw moment when the vehicle dynamics control is inoperative, selecting a controlled variable of vehicle dynamics control as the final desired yaw moment when the vehicle dynamics control is operative, determining, based on the driving condition, a lane-deviation tendency of the host vehicle from a driving lane, executing the lane deviation prevention control by producing a yaw moment corresponding to the controlled variable of the lane deviation prevention control and acting on the host vehicle in a direction that lane deviation is prevented, and compensating for a decision of the driving stability, based on the controlled variable of the lane deviation prevention control.

According to another aspect of the invention, a method of balancing a vehicle dynamics control system and a lane deviation prevention control system, the method comprises detecting at least a turning condition and a driving condition of a host vehicle, determining a driving stability including a vehicle driveability and a vehicle stability, based on at least the turning condition, executing the vehicle dynamics control by producing a yaw moment corresponding to a controlled variable of the vehicle dynamics control that improves the driving stability when the driving stability is deteriorated, executing the lane deviation prevention control by producing a yaw moment corresponding to a controlled variable of the lane deviation prevention control that prevents lane deviation, and softening a criterion, which is used to determine the driving stability, based on the controlled variable of the lane deviation prevention control, only when the vehicle dynamics control is inoperative.

According to another aspect of the invention, a vehicle dynamics control apparatus comprises sensor means for detecting at least a turning condition and a driving condition of a host vehicle, actuating means for producing a yaw moment acting on the host vehicle, and a control unit configured to be electronically connected to the sensor means and the actuating means, for enabling vehicle dynamics control and lane deviation prevention control, the control unit comprising a driving stability decision means for determining a driving stability including a vehicle driveability and a vehicle stability, based on at least the turning condition, a yawing-motion control means for controlling a yawing motion of the host vehicle by producing the yaw moment corresponding to a final desired yaw moment and acting in a direction that improves the driving stability when the driving stability is deteriorated, the final desired yaw moment being determined to be equal to a controlled variable of the lane deviation prevention control when the vehicle dynamics control is inoperative and determined to be equal to a controlled variable of the vehicle dynamics control when the vehicle dynamics control is operative, a lane deviation prevention means for determining, based on the driving condition, a lane-deviation tendency of the host vehicle from a driving lane, and executes the lane deviation prevention control by producing the yaw moment corresponding to the controlled variable of the lane deviation prevention control and acting in a direction that lane deviation is prevented, and a driving stability decision compensation means for compensating for a decision of the driving stability, based on the controlled variable of the lane deviation prevention control.

According to another aspect of the invention, a vehicle dynamics control apparatus comprises sensor means for detecting at least a turning condition and a driving condition of a host vehicle, actuating means for producing a yaw moment acting on the host vehicle, control means configured to be electronically connected to the sensor means and the actuating means, for enabling vehicle dynamics control and lane deviation prevention control, the control means comprising a processor programmed to perform the following, determining a driving stability including a vehicle driveability and a vehicle stability, based on at least the turning condition, executing the vehicle dynamics control by producing the yaw moment corresponding to a controlled variable of the vehicle dynamics control that improves the driving stability when the driving stability is deteriorated, executing the lane deviation prevention control by producing the yaw moment corresponding to a controlled variable of the lane deviation prevention control that prevents lane deviation, and softening a criterion, which is used to determine the driving stability, based on the controlled variable of the lane deviation prevention control, only when the vehicle dynamics control is inoperative.

The other objects and features of this invention will become understood from the following description with reference to the accompanying drawings.

BRIEF DESCRIPTION OF THE DRAWINGS

FIGS. 6A–6E are time charts explaining the operation of the vehicle dynamics control apparatus of the embodiment using a compensated desired yaw rate ($\phi r^* + Kfh \times MsL$), obtained by compensating for a VDC desired yaw rate $\phi r^*$ based on an LDP desired yaw moment MsL, as a final desired yaw rate $\Phi rh$ ($\Phi rh = \phi r^* + Kfh \times MsL$), and respectively show variations in an absolute value |XS| of a lane-deviation estimate XS, steering angle δ, final desired yaw rate $\Phi rh$ ($\Phi rh = \phi r^* + Kfh \times MsL$) and an actual yaw rate $\phi'$, and a front desired wheel-brake cylinder pressure difference $\Delta Ps_F$.

DESCRIPTION OF THE PREFERRED EMBODIMENTS

Figure 1:
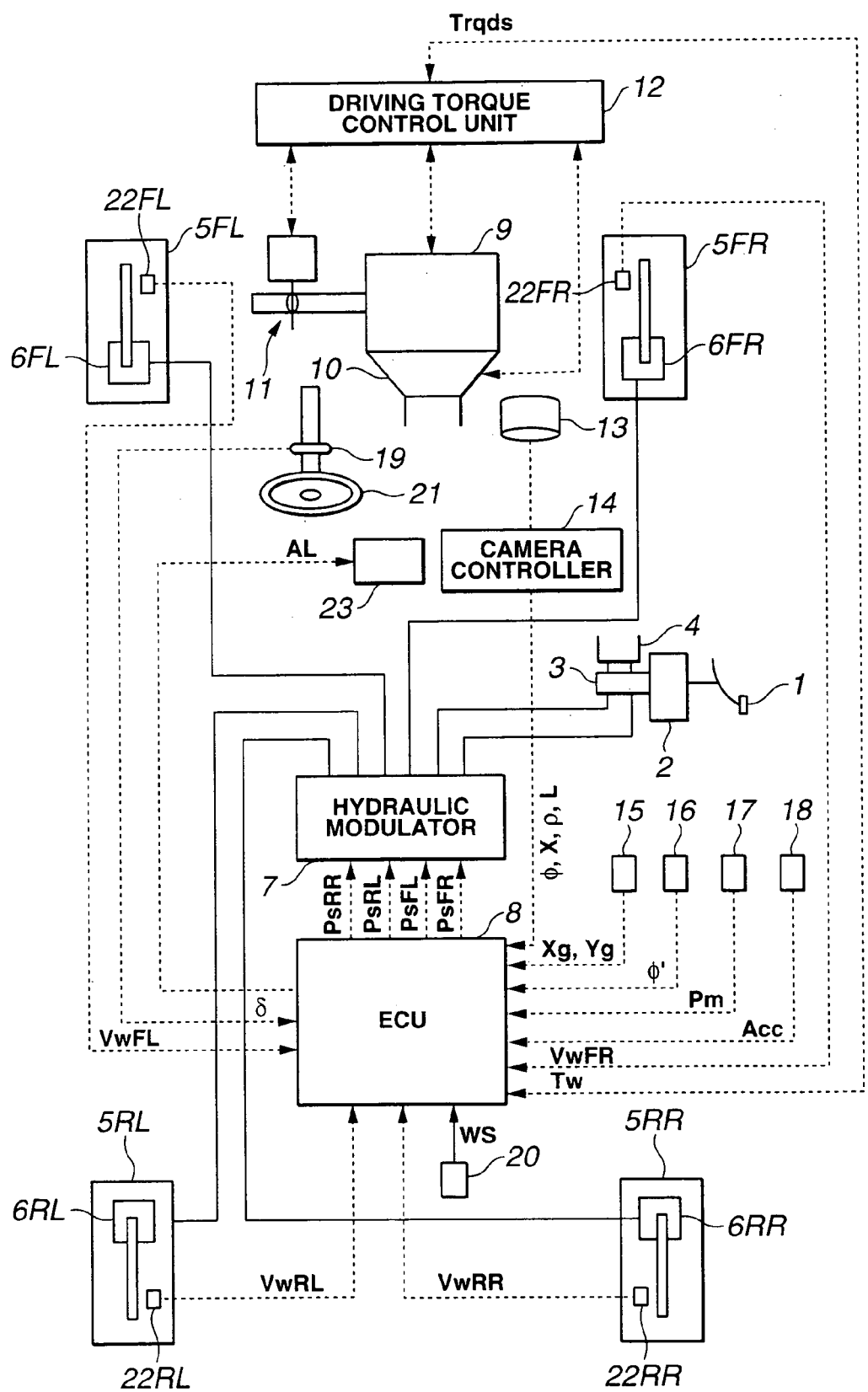
FIG. 1 is a system block diagram illustrating an embodiment of a vehicle dynamics control apparatus enabling a VDC function and an LDP function.

Referring now to the drawings, particularly to FIG. 1, the vehicle dynamics control apparatus of the embodiment is exemplified in an automotive VDC system equipped rear-wheel-drive vehicle employing an automatic transmission 10 and a rear differential. In the system of the embodiment shown in FIG. 1, as a braking force control system, which regulates hydraulic brake pressures of individual wheel-brake cylinders (i.e., front-left, front-right, rear-left, and rear-right wheel-brake cylinders) independently of each other, a four-channel braking control system such as a four-channel ABS system for anti-skid control or a four-channel traction control system for traction control is utilized. In FIG. 1, reference sign 1 denotes a brake pedal, reference sign 2 denotes a brake booster, reference sign 3 denotes a master cylinder (exactly, a tandem master cylinder used for a dual brake system split into two sections, namely front and rear hydraulic brake sections), and reference sign 4 denotes a brake fluid reservoir. Usually, a brake fluid pressure, risen by master cylinder 3 depending on the amount of depression of brake pedal 1, is supplied to each of a front-left wheel-brake cylinder 6FL for a front-left road wheel 5FL, a front-right wheel-brake cylinder 6FR for a front-right road wheel 5FR, a rear-left wheel-brake cylinder 6RL for a rear-left road wheel 5RL, and a rear-right wheel-brake cylinder 6RR for a rear-right road wheel 5RR. Front-left, front-right, rear-left, and rear-right wheel-brake cylinder pressures are regulated independently of each other by means of a brake fluid pressure control circuit (a wheel cylinder pressure control unit) or a hydraulic modulator 7, which is disposed between master cylinder 3 and each of wheel-brake cylinders 6FL, 6FR, 6RL, and 6RR. Hydraulic modulator 7 includes hydraulic pressure control actuators respectively associated with first-channel (front-left), second-channel (front-right), third-channel (rear-left), and fourth-channel (rear-right) brake circuits, such that front-left, front-right, rear-left, and rear-right wheel-brake cylinder pressures are built up, held, or reduced independently of each other. Each of the hydraulic pressure control actuators of hydraulic modulator 7 is comprised of a proportional solenoid valve such as an electromagnetically-controlled solenoid valve that regulates the wheel-brake cylinder pressure to a desired pressure level. Each of the electromagnetically-controlled solenoid valves of hydraulic modulator 7 is responsive to a command signal from a braking/driving force control unit, simply an electronic control unit (ECU) 8, for regulating the wheel-cylinder pressure of each of wheel-brake cylinders 6FL–6RR in response to the command signal value from ECU 8.

The automotive VDC system equipped rear-wheel-drive vehicle of the embodiment of FIG. 1 also includes an electronic driving torque control unit 12 that controls a driving torque transmitted to rear road wheels 5RL and 5RR serving as drive wheels, by controlling an operating condition of an engine 9, a selected transmission ratio of automatic transmission 10, and/or a throttle opening of a throttle valve 11 (correlated to an accelerator opening Acc). Concretely, the operating condition of engine 9 can be controlled by controlling the amount of fuel injected or an ignition timing. Also, the engine operating condition can be controlled by the throttle opening control. Driving torque control unit 12 is designed to individually control the driving torque transmitted to rear road wheels 5RL and 5RR (drive wheels). Additionally, driving torque control unit 12 is responsive to a driving-torque command signal from ECU 8 in a manner so as to control the driving torque depending on the driving-torque command signal value.

The automotive VDC system equipped rear-wheel-drive vehicle of the embodiment of FIG. 1 also includes a stereo-camera with a charge-coupled device (CCD) image sensor, simply, a charge-coupled device (CCD) camera 13 and a camera controller 14 as an external recognizing sensor, which functions to detect a position of the VDC system equipped vehicle (the host vehicle) within the driving lane (the host vehicle's traffic lane) and whose sensor signal is used for the lane deviation avoidance control or lane deviation prevention (LDP) control. Within camera controller 14, on the basis of an image-processing image data in front of the host vehicle and captured by CCD camera 13, a lane marker or lane marking, such as a white line, is detected and thus the current host vehicle's traffic lane, in other words, the current position of the host vehicle within the host vehicle's lane, is detected. Additionally, the processor of camera controller 14 calculates or estimates, based on the image data from CCD camera 13 indicative of the picture image, a host vehicle's yaw angle $\phi$ with respect to the direction of the current driving lane (the host vehicle's lane), a host vehicle's lateral displacement or a host vehicle's lateral deviation X from a central axis of the current host vehicle's driving lane, a curvature $\rho$ of the current host vehicle's driving lane, and a lane width L of the current driving lane. When the lane marker or lane marking, such as a white line, in front of the host vehicle, has worn away or when the lane markers or lane markings are partly covered by snow, it is impossible to precisely certainly recognize the lane markers or lane markings. In such a case, each of detection parameters, that is, the host vehicle's yaw angle $\phi$, lateral deviation X, curvature $\rho$, and lane width L is set to "0". In contrast, in presence of a transition from a white-line recognition enabling state that the lane marking, such as a white line, can be recognized continually precisely to a white-line recognition partly disabling state that the lane marking, such as a white-line, cannot be recognized for a brief moment, owing to noise or a frontally-located obstacle, parameters $\phi$, X, $\rho$, and L are held at their previous values $\phi_{(n-1)}$, $X_{(n-1)}$, $\rho_{(n-1)}$, and $L_{(n-1)}$ calculated by camera controller 14 one cycle before.

Electronic control unit (ECU) 8 generally comprises a microcomputer that includes a central processing unit (CPU) or a microprocessor (MPU), memories (RAM, ROM), and an input/output interface (I/O). In addition to the signals indicative of parameters $\phi$, X, $\rho$, and L calculated by camera controller 14, and the signal indicative of a driving torque Tw, controlled and produced by driving-torque control unit 12, the input/output interface (I/O) of ECU 8 receives input information from various engine/vehicle switches and sensors, such as an acceleration sensor 15, a yaw rate sensor 16, a master-cylinder pressure sensor 17, an accelerator opening sensor 18, a steer angle sensor 19, front-left, front-right, rear-left, and rear-right wheel speed sensors 22FL, 22FR, 22RL, and 22RR, and a direction indicator switch 20. As seen from the system block diagram of FIG. 1, for mutual communication via a data link, ECU 8 is electrically connected to driving torque control unit 12. Acceleration sensor 15 is provided to detect a longitudinal acceleration Xg and a lateral acceleration Yg, exerted on the host vehicle. Yaw rate sensor 16 (serving as a driving condition detection means) is provided to detect a yaw rate $\phi'$ resulting from a yaw moment acting on the host vehicle. Master-cylinder pressure sensor 17 is provided to detect a master-cylinder pressure Pm of master cylinder 3, that is, the amount of depression of brake pedal 1. Accelerator opening sensor 18 is provided to detect an accelerator opening Acc (correlated to a throttle opening), which is dependent on a manipulated variable of the driver's accelerator-pedal depression. Steer angle sensor 19 (serving as a turning condition detection means) is provided to detect steer angle δ of a steering wheel 21. Front-left, front-right, rear-left, and rear-right wheel speed sensors 22FL, 22FR, 22RL, and 22RR are provided respectively to detect front-left, front-right, rear-left, and rear-right wheel speeds $Vw_{FL}$, $Vw_{FR}$, $Vw_{RL}$, and $Vw_{RR}$, which are collectively referred to as "Vwi". Direction indicator switch 20 is provided to detect whether a direction indicator is turned on and also detects the direction indicated by the direction indicator, and to output a direction indicator switch signal WS. In the presence of a directionality or polarity concerning left or right directions of each of the vehicle driving state indicative data, namely, yaw rate φ', lateral acceleration Yg, steer angle δ, yaw angle φ, and lateral deviation X, a change in the vehicle driving state indicative data to the left is indicated as a positive value, while a change in the vehicle driving state indicative data to the right is indicated as a negative value. More concretely, during a left turn, yaw rate φ', lateral acceleration Yg, steer angle δ, and yaw angle φ are all indicated as positive values. Conversely during a right turn, these parameters φ', Yg, δ, and φ are all indicated as negative values. On the other hand, lateral deviation X is indicated as a positive value when the host vehicle is deviated from the central axis of the current host vehicle's driving lane to the left. Conversely when the host vehicle is deviated from the central axis of the current host vehicle's driving lane to the right, lateral deviation X is indicated as a negative value. The positive signal value of direction indicator switch signal WS from direction indicator switch 20 means a left turn (counterclockwise rotation of direction indicator switch 20), whereas the negative signal value of direction indicator switch signal WS from direction indicator switch 20 means a right turn (clockwise rotation of direction indicator switch 20). ECU 8 is also connected to a warning system 23 having a warning buzzer and/or a warning light, which comes on in response to an alarm signal AL from ECU 8, so that a visual and/or audible warning is signaled to the driver. Within ECU 8 when there is a possibility of the host vehicle's lane deviation, the central processing unit (CPU) allows the access by the I/O interface of input informational data signals from the previously-discussed engine/vehicle switches and sensors and camera controller 14 and driving torque control unit 12, and is responsible for carrying various control programs stored in the memories and capable of performing necessary arithmetic and logic operations. Computational results or arithmetic calculation results, in other words, calculated output signals or control command signals are relayed via the output interface circuitry to the output stages, for example, the solenoids of hydraulic modulator 7 and the warning buzzer/warning light of warning system 23.

Figure 2:
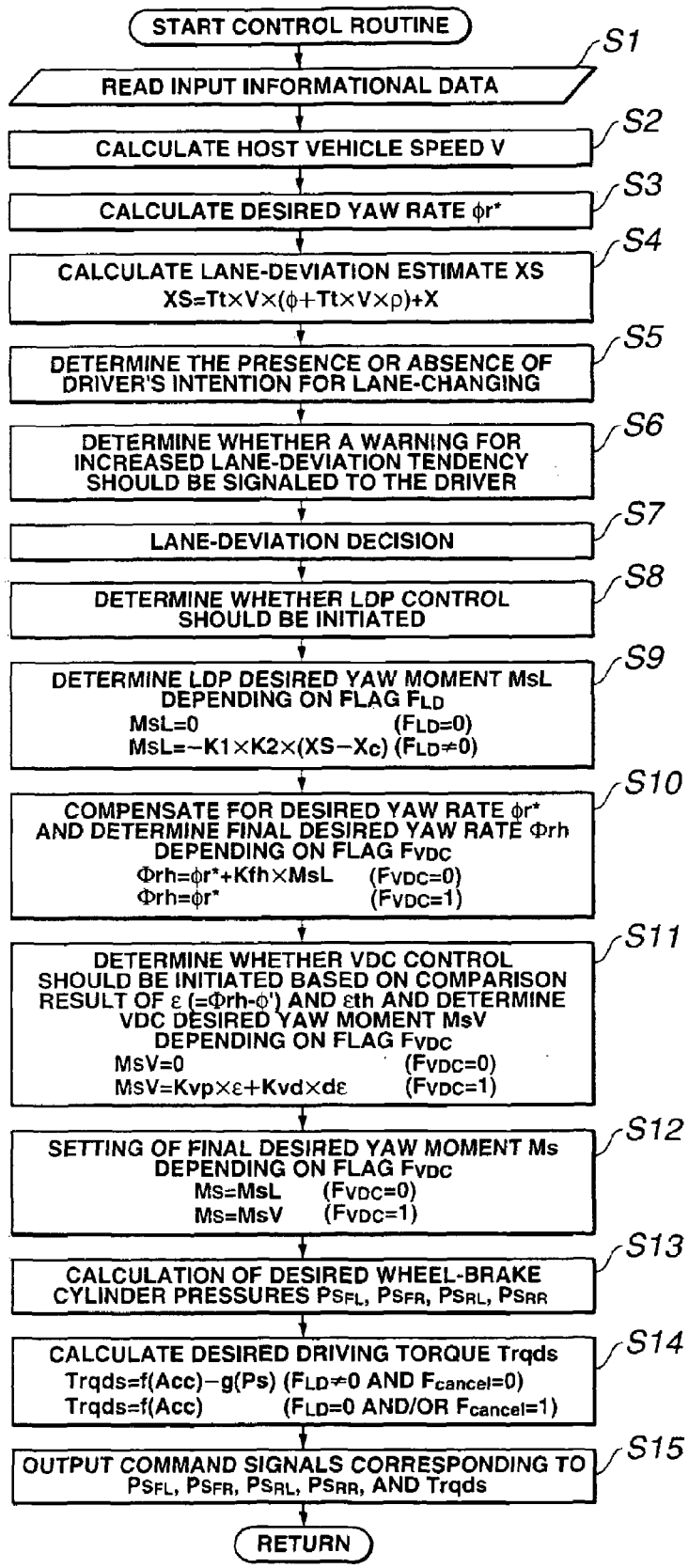
FIG. 2 is a flow chart showing a control routine (arithmetic and logic operations) executed within a braking/driving force control unit incorporated in the vehicle dynamics control apparatus of the embodiment shown in FIG. 1.

The control routine executed by ECU 8 is hereunder described in detail in reference to the flow charts shown in FIG. 2. The control routine of FIG. 2 is executed as time-triggered interrupt routines to be triggered every predetermined sampling time intervals such as 10 milliseconds.

At step S1, input informational data from the previously-noted engine/vehicle switches and sensors, and driving-torque controller 12 and camera controller 14 are read. Concretely, engine/vehicle switch/sensor signal data, such as the host vehicle's longitudinal acceleration Xg, lateral acceleration Yg, yaw rate φ', wheel speeds Vwi ($Vw_{FL}$, $Vw_{FR}$, $Vw_{RL}$, $Vw_{RR}$), accelerator opening Acc, master-cylinder pressure Pm, steer angle δ, and direction indicator switch signal WS, and the signal data from driving-torque control unit 12 such as driving torque Tw, and the signal data from camera controller 14 such as the host vehicle's yaw angle φ with respect to the direction of the current host vehicle's driving lane, lateral deviation X from the central axis of the current host vehicle's driving lane, curvature ρ of the current driving lane, and lane width L of the current driving lane are read. The host vehicle's yaw angle φ may be calculated by integrating yaw rate φ' detected by yaw rate sensor 16.

At step S2, a host vehicle's speed V is calculated as a simple average value (($Vw_{FL}$+$Vw_{FR}$)/2) of front-left and front-right wheel speeds $Vw_{FL}$ and $Vw_{FR}$ (corresponding to wheels speeds of driven road wheels 5FL and 5FR), from the expression V=($Vw_{FL}$+$Vw_{FR}$)/2.

At step S3, a vehicle dynamics control (VDC) desired yaw rate φr* is calculated.

Figure 3:
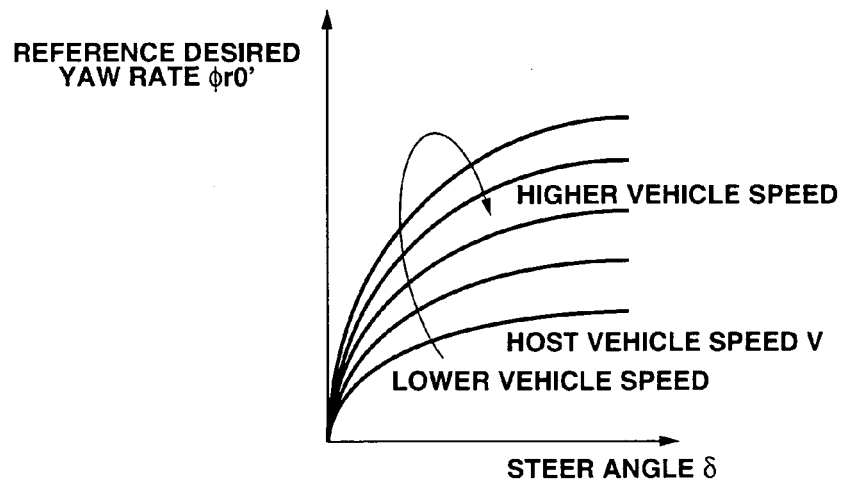
FIG. 3 is a predetermined control map showing the relationship among a host vehicle's speed V, a steering angle δ, and a reference desired yaw rate $\phi r0'$.

First, reference desired yaw rate φr0' is retrieved based on steer angle δ and host vehicle's speed V from the predetermined V–δ–φr0' characteristic map shown in FIG. 3. In FIG. 3, the axis of abscissa (the x-axis) indicates steer angle δ, the axis of ordinate (the y-axis) indicates reference desired yaw rate φr0'. As shown in FIG. 3, when steer angle δ is "0", reference desired yaw rate φr' is "0". At the initial stage that steer angle δ begins to increase from "0", reference desired yaw rate φr' tends to quickly increase in accordance with an increase in steer angle δ. Thereafter, in accordance with a further increase in steer angle δ, reference desired yaw rate φr' tends to moderately increase parabolically. On the other hand, at the initial stage that host vehicle's speed V begins to increase from a low speed value, for the same steer angle, reference desired yaw rate φr' tends to increase in accordance with an increase in host vehicle's speed V. Thereafter, as soon as host vehicle's speed V exceeds a predetermined vehicle-speed threshold value, for the same steer angle, reference desired yaw rate φr' tends to decrease in accordance with an increase in host vehicle's speed V.

Second, reference desired yaw rate φr' is compensated for based on a coefficient of road-surface friction. Concretely, in order to derive a friction-dependent desired yaw rate correction value, simply a desired yaw rate correction value φrh', reference desired yaw rate φr' is compensated for based on lateral acceleration Yg, exactly based on a yaw-rate upper limit, simply a yaw-rate limit φlim' in accordance with the following expression (1).

$$\varphi rh' = \min(\varphi r0', \varphi lim') \quad (1)$$

The aforementioned expression φrh'=min(φr', φlim') means a so-called select-LOW process through which a smaller one of reference desired yaw rate φr' and yaw-rate limit φlim' is selected as desired yaw rate correction value φrh'. Yaw-rate limit φlim' is arithmetically calculated based on lateral acceleration Yg and host vehicle's speed V from the following expression (2).

$$\varphi lim' = Km \times (Yg/V) \quad (2)$$

where Km denotes a correction factor that is set to a predetermined constant value, such as 1.25, taking into account a delay of development of lateral acceleration Yg.

Lateral acceleration Yg exerted on the vehicle tends to reduce, as the road-surface friction coefficient μ decreases. For this reason, during driving on low-μ roads, yaw-rate limit φlim' is set to a comparatively small value, and thus reference desired yaw rate φr' is compensated for and limited to a smaller value.

In the system of the embodiment, reference desired yaw rate ϕr' is compensated for and limited based on lateral acceleration Yg, which is correlated to the road-surface friction coefficient μ. In lieu thereof, the road-surface friction coefficient μ itself may be estimated, and desired yaw rate correction value ϕrh' may be arithmetically calculated from the following expression (3), so that reference desired yaw rate ϕr' is compensated for directly based on the road-surface friction coefficient μ.

$$\phi rh' = \mu \times \phi r0' \qquad (3)$$

Third, sideslip angle β is arithmetically calculated from the following expression (4).

$$\beta = d\beta + \beta_0 \qquad (4)$$

where $\beta_0$ denotes a previous sideslip angle calculated one cycle before and dβ denotes a variation (a rate-of-change) in sideslip angle β with respect to a predetermined time interval and arithmetically calculated from an expression dβ=−ϕ'+(Yg/V) where ϕ' denotes the actual yaw rate, Yg denotes lateral acceleration, and V host vehicle's speed.

That is, as appreciated from the aforesaid expressions dβ=−ϕ'+(Yg/V) and β=dβ+β₀, sideslip-angle variation dβ is arithmetically calculated based on all of the actual yaw rate ϕ', lateral acceleration Yg, and host vehicle's speed V, and thereafter sideslip angle β is calculated by integrating the sideslip-angle variation dβ. Instead of deriving sideslip angle β sideslip-angle variation dβ) by way of arithmetic calculation based on vehicle dynamic behavior indicative sensor values such as yaw rate ϕ', lateral acceleration Yg, and host vehicle's speed V, sideslip angle β may be estimated and determined by way of sideslip-angle estimation based on sensor signal values such as yaw rate ϕ' detected by the yaw rate sensor, lateral acceleration Yg detected by the lateral-G sensor, host vehicle's speed V detected by the vehicle speed sensor, steer angle δ detected by the steer angle sensor, and a vehicle model such as a two-wheel model, in other words, by way of an observer function, as described in Japanese Patent Provisional Publication No. 11-160205.

Fourth, a desired sideslip angle βr is arithmetically calculated based on desired yaw rate correction value ϕrh', exactly a desired lateral velocity Vyc in accordance with the following expression (5), that is, a steady-state formula for the two-wheel model.

$$\beta r = Vyc/V \qquad (5)$$

where Vyc denotes the desired lateral velocity and V denotes the host vehicle's speed. Desired lateral velocity Vyc of the above expression (5) is arithmetically calculated from the following expression (6).

$$Vyc = (Lr - Kc \times V^2) \times \phi rh' \qquad (6)$$

where Kc denotes a constant that is determined by specifications of the host vehicle and Lr denotes a distance from the center of gravity of the host vehicle to the rear axle. Constant Kc of the above expression (6) is arithmetically calculated from the following expression (7).

$$Kc = (m \times Lf)/(2 \times L \times CPr) \qquad (7)$$

where L denotes a wheelbase of the host vehicle, Lf denotes a distance from the center of gravity of the host vehicle to the front axle, CPr denotes a rear-wheel cornering power, and m denotes a vehicle weight (a mass of the host vehicle).

Finally, VDC desired yaw rate ϕr* is calculated by further compensating for desired yaw rate correction value ϕrh' based on the actual sideslip angle β and desired sideslip angle βr (see the following expression (8)).

$$\phi r^* = \phi rh' - (Kbp \times dB + Kbd \times ddB) \qquad (8)$$

where dB denotes a deviation (β−βr) between actual sideslip angle β and desired sideslip angle βr, ddB denotes a variation d(β−βr) of sideslip-angle deviation dB with respect to a predetermined time interval such as 50 milliseconds, and Kbp and Kbd denote control gains.

As set out above in reference to step S3 of FIG. 2, according to the system of the embodiment, by compensating for reference desired yaw rate ϕr', exactly desired yaw rate correction value ϕrh', the VDC control can be performed, taking account of the sideslip angle (exactly, the sideslip-angle deviation dB (=β−βr) between actual sideslip angle β and desired sideslip angle βr and/or rate-of-change ddB=d(β−βr) of sideslip-angle deviation dB) as well as a yaw-rate deviation ε (described later) between a desired yaw rate Φrh (described later in reference to step S10 of FIG. 2) or ϕr*' (described later in reference to step S22 of FIG. 8) and actual yaw rate ϕ'. Concretely, when desired sideslip angle βr is relatively greater than actual sideslip angle β, that is, β<βr, the sign of (Kbp×dB+Kbd×ddB) of the right-hand side of the expression (8), i.e., ϕr*=ϕrh'−(Kbp×dB+Kbd×ddB), becomes negative, because dB (=β−βr) and ddB (=d(β−βr)) are negative, and thus VDC desired yaw rate ϕr* is represented by ϕr*=ϕrh'+|Kbp×dB+Kbd×ddB|. That is, in case of β<βr, in order to enhance vehicle driveability or maneuverability, and thus to ensure easy change of vehicle heading or easy turning, VDC desired yaw rate ϕr* tends to increase. Conversely when desired sideslip angle βr is relatively less than or equal to actual sideslip angle β, that is, β≧βr, the sign of (Kbp×dB+Kbd×ddB) of the right-hand side of the expression (8), i.e., ϕr*=ϕrh'−(Kbp×dB+Kbd×ddB), becomes positive, because dB (=β−βr) and ddB (=d(β−βr)) are positive, and thus VDC desired yaw rate ϕr* is represented by ϕr*=ϕrh'−|Kbp×dB+Kbd×ddB|. That is, in case of β≧βr, in order to enhance vehicle driving stability, VDC desired yaw rate ϕr* tends to decrease.

At step S4, a lane-deviation estimate XS, in other words, an estimate of a future lateral deviation, is estimated or arithmetically calculated based on the latest up-to-date information concerning the host vehicle's yaw angle ϕ with respect to the direction of the current host vehicle's driving lane, lateral deviation X from the central axis of the current host vehicle's driving lane, curvature ρ of the current host vehicle's driving lane, and the host vehicle's speed V calculated through step S2, from the following expression (9).

$$XS = Tt \times V \times (\phi + Tt \times V \times \rho) + X \qquad (9)$$

where Tt denotes a headway time between the host vehicle and the preceding vehicle both driving in the same sense and in the same lane, and the product (Tt×V) of the headway time Tt and the host vehicle's speed V means a distance between the current position of the host vehicle and the forward point-of-fixation. That is, an estimate of lateral deviation from the central axis of the current host vehicle's driving lane, which may occur after the headway time Tt, is regarded as an estimate of a future lateral deviation, that is, a lane-deviation estimate XS. In the shown embodiment, ECU 8 determines that there is a possibility or an increased tendency of lane deviation of the host vehicle from the current driving lane, when lane-deviation estimate XS becomes greater than or equal to a predetermined lane-deviation criterion $X_C$. In the same manner as the actual lateral deviation X, a positive lane-deviation estimate XS means lane deviation to the left, whereas a negative lane-deviation estimate XS means lane deviation to the right. Exactly speaking, although the amount of lane deviation corresponds to a lateral displacement of the host vehicle from the lane-marker of the host vehicle's driving lane, in the system of the embodiment lane-deviation estimate XS is regarded as the amount of lane deviation, because of lateral-deviation estimation based on the host vehicle's lateral displacement from the central axis (reference axis) of the current host vehicle's driving lane.

At step S5, a check is made to determine, based on direction indicator switch signal WS from direction indicator switch 20 and steer angle $\delta$ detected by steer angle sensor 19, whether a driver's intention for lane changing is present or absent.

Concretely, at step S5, a check is made to determine whether direction indicator switch 20 is turned on. When direction indicator switch 20 is turned on, a further check is made to determine whether the sign of direction indicator switch signal WS is identical to the sign of lane-deviation estimate XS calculated through step S3. When the signs of direction indicator switch signal WS and lane-deviation estimate XS are identical to each other, the processor of ECU 8 determines that the host vehicle is conditioned in the lane changing state and thus a lane-changing indicative flag $F_{LC}$ is set to "1". Conversely when the signs of direction indicator switch signal WS and lane-deviation estimate XS are not identical to each other, the processor of ECU 8 determines that the host vehicle is not conditioned in the lane changing state but there is an increased tendency of the host vehicle's lane deviation, and thus lane-changing indicative flag $F_{LC}$ is reset to "0". Actually, lane-changing indicative flag $F_{LC}$ is held at "1" for a predetermined time interval, such as four seconds, from the time when lane-changing indicative flag $F_{LC}$ has been set to "1" by turning the direction indicator switch 20 on. This is because there is a possibility that direction indicator switch 20 is manually turned off during lane-changing and thus the LDP control may be engaged undesirably. More concretely, a check is made to determine whether direction indicator switch 20 has been switched from the turned-on state to the turned-off state. When switching from the turned-on state to turned-off state has occurred, ECU 8 determines that the current point of time corresponds to the time just after lane-changing operation, and thus a further check is made to determine whether the predetermined time interval, for example four seconds, measured or counted from the time when switching from the turned-on state of direction indicator switch 20 to turned-off state has occurred, has expired. When the predetermined time interval has expired, lane-changing indicative flag $F_{LC}$ is reset to "0".

Taking into account the driver's steering operation under a condition that direction indicator switch 20 remains turned off, a still further check for the presence or absence of the driver's intention for lane changing is made based on steer angle $\delta$ and a variation $\Delta\delta$ in steer angle $\delta$. Concretely, with direction indicator switch 22 turned off, a check is made to determine whether steer angle $\delta$ is greater than or equal to a predetermined steer angle $\delta_s$ and additionally a variation $\Delta\delta$ in steer angle $\delta$ is greater than or equal to a predetermined change $\Delta\delta_s$. In case of $\delta \geq \delta_s$ and $\Delta\delta \geq \Delta\delta_s$, ECU 8 determines that a driver's intention for lane changing is present, and thus lane-changing indicative flag $F_{LC}$ is set to "1". Conversely in case of $\delta < \delta_s$ or $\Delta\delta < \Delta\delta_s$, ECU 8 determines that a driver's intention for lane changing is absent, and thus lane-changing indicative flag $F_{LC}$ is reset to "0". Thereafter, the routine proceeds from step S5 to step S6 (described later).

As discussed above, in the shown embodiment, the presence or absence of the driver's intention for lane changing is determined based on both of steer angle $\delta$ and its change $\Delta\delta$. In lieu thereof, the presence or absence of the driver's intention for lane changing may be determined based on the magnitude of steering torque acting on the steering wheel.

At step S6, a check is made to determine, based on the absolute value $|XS|$ of lane-deviation estimate XS (exactly, a comparison result of lane-deviation estimate absolute value $|XS|$ and a predetermined alarm criterion $X_W$)) and setting or resetting of lane-changing indicative flag $F_{LC}$, whether a visual and/or audible warning for the increased host vehicle's lane-deviation tendency should be signaled to the driver. Concretely, a check is made to determine whether lane-changing indicative flag $F_{LC}$ is reset to "0" and additionally the absolute value $|XS|$ of lane-deviation estimate XS is greater than or equal to predetermined alarm criterion $X_W$ (exactly, a predetermined alarm criterion threshold value). Predetermined alarm criterion $X_W$ is obtained by subtracting a predetermined margin $X_m$ (a predetermined constant) from predetermined lane-deviation criterion $X_C$ (see the following expression (10)).

$$X_W = X_C - X_m \quad (10)$$

where predetermined lane-deviation criterion $X_C$ means a preset criterion threshold value of lateral displacement of the host vehicle from the central axis of the current host vehicle's driving lane, and predetermined margin $X_m$ corresponds to a margin from a time when warning system 23 has been switched to an operative state to a time when the LDP function has been engaged or enabled. In case of $F_{LC}=0$ and $|XS| \geq X_W$, ECU 8 determines that the host vehicle is in a lane-deviation state where there is an increased tendency for the host vehicle to deviate from the current host vehicle's driving lane, and thus the output interface of ECU 8 generates alarm signal AL to warning system 23. On the contrary, in case of $F_{LC}=1$ or $|XS|<X_W$, ECU 8 determines that the host vehicle is out of the lane-deviation state, and thus another check is made to determine whether warning system 23 is in operation. During operation of warning system 23, another check is made to determine whether the absolute value $|XS|$ of lane-deviation estimate XS is less than a difference $(X_W-X_h)$ between predetermined alarm criterion $X_W$ and a predetermined hysteresis $X_h$. Predetermined hysteresis $X_h$ is provided to avoid undesirable hunting for warning system 23. In case of $|XS|<(X_W-X_h)$, warning system 23 is deactivated by stopping the output of alarm signal AL to warning system 23. That is to say, until the lane-deviation estimate XS is transferred to the state defined by $|XS|<(X_W-X_h)$ after warning system 23 has been activated, the warning operation of warning system 23 is continually executed. In the system of the shown embodiment, the visual and/or audible warning (the output of alarm signal AL to warning system 23) is dependent upon only the amount of lane deviation (i.e., lane-deviation estimate XS).

At step S7, the processor of ECU 8 makes a lane-deviation decision. Concretely, at step S7, a check is made to determine whether lane-deviation estimate XS is greater than or equal to predetermined lane-deviation criterion $X_C$ (a positive lane-deviation criterion). For instance, predetermined lane-deviation criterion $X_C$ is set to 0.8 meter, since a width of a traffic lane of an express-highway in Japan is 3.35 meters. In case of $XS \geq X_C$, ECU 8 determines that there is an increased tendency for the host vehicle to deviate from the current driving lane to the left, and thus a lane-deviation decision flag $F_{LD}$ is set to "+1". On the contrary, in case of $XS<X_C$, another check is made to determine whether lane-deviation estimate XS is less than or equal to a negative value $-X_C$ of predetermined lane-deviation criterion $X_C$. In case of $XS \leq -X_C$, ECU 8 determines that there is an increased tendency for the host vehicle to deviate from the current driving lane to the right, and thus lane-deviation decision flag $F_{LD}$ is set to "−1". Alternatively, when the condition defined by $XS \geq X_C$ and $XS \leq -X_C$ are both unsatisfied, that is, in case of $-X_C<XS<X_C$, ECU 8 determines that there is a less possibility of the host vehicle's lane deviation from the current driving lane to the right or to the left, and thus lane-deviation decision flag $F_{LD}$ is reset to "0". Thereafter, a further check is made to determine whether lane-changing indicative flag $F_{LC}$ is set to "1". In case of $F_{LC}=1$, lane-deviation decision flag $F_{LD}$ is forcibly reset to "0". In case of $F_{LC}=0$, a check is made to determine whether lane-deviation decision flag $F_{LD}$ is reset to "0". In case of $F_{LD}=0$, an LDP control canceling flag or an LDP control inhibiting flag $F_{cancel}$ is reset to "0".

In case of $F_{LD}=1$, at step S8, a check is made to determine whether the LDP control should be initiated. Actually, historical data of lane-deviation estimate XS, calculated through step S4, are stored in predetermined memory addresses of the RAM of ECU 8. Then, the continuity or discontinuity of lane-deviation estimate XS is determined based on the historical data of lane-deviation estimate XS. Concretely, a check is made to determine whether the absolute value $|XS_{(n-1)}-XS_{(n)}|$ of the difference between the previous value $XS_{(n-1)}$ of lane-deviation estimate XS and the current value $XS_{(n)}$ of lane-deviation estimate XS is greater than or equal to a predetermined threshold value $L_{XS}$, which is provided to determine the continuity or discontinuity of lane-deviation estimate XS. More concretely, in case of $F_{LD}\neq 0$ (that is, $F_{LD}=1$ or −1) and $|XS_{(n-1)}-XS_{(n)}| \geq L_{XS}$, ECU 8 determines that lane-deviation estimate XS is discontinuous and thus LDP control inhibiting flag $F_{cancel}$ is set to "1". Conversely, in case of $|XS_{(n-1)}-XS_{(n)}|<L_{XS}$, ECU 8 determines that lane-deviation estimate XS is continuous. LDP control inhibiting flag $F_{cancel}$ is reset to "0" when lane-deviation decision flag $F_{LD}$ is switched to "0". In other words, LDP control inhibiting flag $F_{cancel}$ is maintained at "0", until lane-deviation decision flag $F_{LD}$ is transferred from the state of $F_{LD}\neq 0$ to the state of $F_{LD}=0$.

Figure 4:
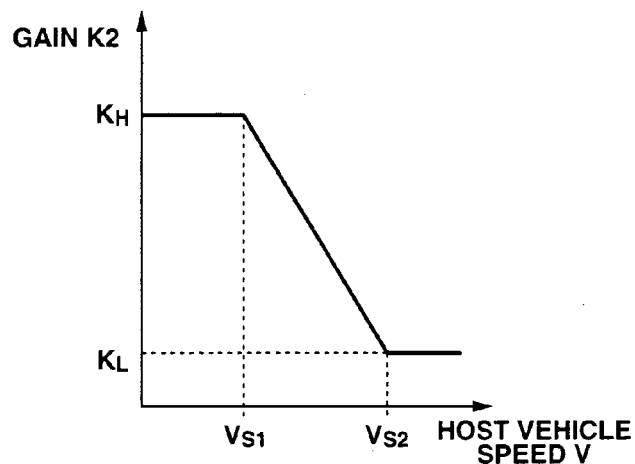
FIG. 4 is a predetermined host vehicle's speed V versus gain K2 characteristic map.

At step S9, a desired yaw moment MsL for LDP control, simply an LDP desired yaw moment, is arithmetically calculated based on lane-deviation estimate XS and predetermined lane-deviation criterion $X_C$, depending on whether lane-deviation decision flag $F_{LD}$ is conditioned in the state of $F_{LD}\neq 0$ or the state of $F_{LD}=0$. In the system of the embodiment, the positive LDP desired yaw moment MsL means a component of the moment vector tending to rotate the host vehicle about the z-axis counterclockwise (to the left), when looking in the positive direction of the z-axis. The negative LDP desired yaw moment MsL means a component of the moment vector tending to rotate the host vehicle about the z-axis clockwise (to the right), when looking in the positive direction of the z-axis. Concretely, at step S9, only when lane-deviation decision flag $F_{LD}$ is unequal to "0", that is, $F_{LD}\neq 0$, LDP desired yaw moment MsL is arithmetically calculated based on lane-deviation estimate XS and predetermined lane-deviation criterion $X_C$, from the following expression (11).

$$MsL=-K1 \times K2 \times (XS-X_C) \qquad (11)$$

where K1 denotes a proportional gain or a proportional coefficient that is determined by specifications of the host vehicle, and K2 denotes a proportional gain or a variable gain that varies depending on the host vehicle's speed V. Gain K2 is calculated or retrieved from the preprogrammed vehicle-speed V versus gain K2 characteristic map of FIG. 4 showing how a gain K2 has to be varied relative to a host vehicle's speed V. As can be appreciated from the preprogrammed characteristic map of FIG. 4 showing the relationship between gain K2 and vehicle speed V, in a low speed range ($0 \leq V \leq V_{S1}$) from 0 to a predetermined low speed value $V_{S1}$, gain K2 is fixed to a predetermined relatively high gain $K_H$. In a middle and high speed range ($V_{S1}<V \leq V_{S2}$) from the predetermined low speed value $V_{S1}$ to a predetermined high speed value $V_{S2}$ (higher than $V_{S1}$), gain K2 gradually reduces to a predetermined relatively low gain $K_L$, as the host vehicle's speed V increases. In an excessively high speed range ($V_{S2}<V$) above predetermined high speed value $V_{S2}$, gain K2 is fixed to predetermined relatively low gain $K_L$.

Conversely in case of $F_{LD}=0$, LDP desired yaw moment MsL is set to "0".

For the purpose of simplification of the disclosure, in the system of the embodiment, suppose that LDP control is suspended or disengaged during VDC control. That is, a higher priority is put on VDC control rather than LDP control.

At step S10, VDC desired yaw rate φr* is compensated for based on LDP desired yaw moment MsL, calculated through step S9. On the assumption that a higher priority is put on VDC control rather than LDP control, VDC desired yaw rate φr* is compensated for based on LDP desired yaw moment MsL corresponding to the controlled variable of LDP control, in order to use a compensated desired yaw rate φr*+Kfh×MsL (described later), compensated for based on LDP desired yaw moment MsL, as a final desired yaw rate Φrh, only when the VDC control system is conditioned in its inoperative state. That is to say, note that, in the system of the embodiment, only when the VDC control system is kept in the inoperative state ($F_{VDC}=0$), the integrated yawing-motion control system does not use VDC desired yaw rate φr* itself as the final desired yaw rate, but uses the compensated desired yaw rate φr*+Kfh×MsL, compensated for based on LDP desired yaw moment MsL, as the final desired yaw rate Φrh, for the purpose of avoidance of undesirable engagement or malfunction for VDC control during operation of the LDP control system. More concretely, in the system of the embodiment, when the VDC control system is inoperative, in other words, when a VDC control indicative flag $F_{VDC}$ is reset to "0", the compensated desired yaw rate is calculated, based on VDC desired yaw rate φr* and LDP desired yaw moment MsL, from the following expression (12).

$$\Phi rh=\phi r^*+Kfh \times MsL \qquad (12)$$

where Kfh denotes a control gain or a correction coefficient that is determined by specifications of the host vehicle.

On the contrary, when the VDC control system is in operation, i.e., in case of $F_{VDC}=1$, final desired yaw rate Φrh is set to be equal to VDC desired yaw rate φr* calculated through step S3, that is, Φrh=φr*.

Figure 5:
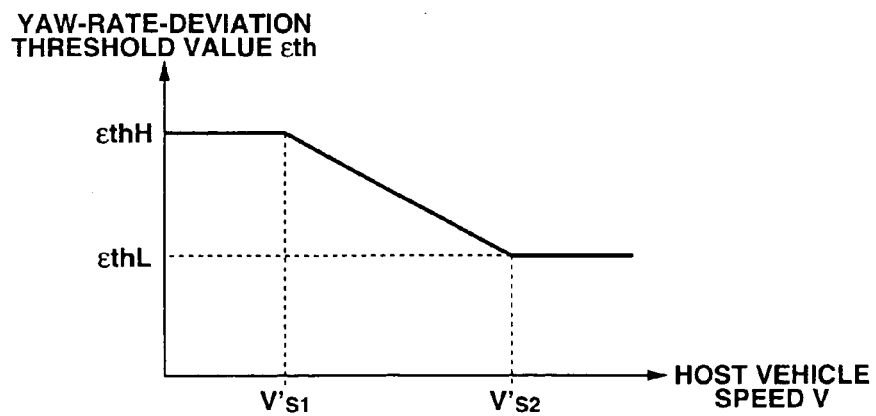
FIG. 5 is a predetermined host vehicle's speed V versus yaw-rate-deviation threshold value εth characteristic map.

At step S11, a desired yaw moment MsV for VDC control, simply a VDC desired yaw moment, is arithmetically calculated discussed hereunder. First, a check is made to determine whether the VDC control should be initiated. Actually, a yaw-rate deviation ε (=Φrh−φ') between the previously-noted final desired yaw rate Φrh and actual yaw rate φ' is compared to a yaw-rate-deviation threshold value εth (see FIG. 5). Yaw-rate-deviation threshold value εth is calculated or retrieved from the preprogrammed vehicle-speed V versus yaw-rate-deviation threshold value εth characteristic map of FIG. 5 showing how a yaw-rate-deviation threshold value εth has to be varied relative to a host vehicle's speed V. As can be appreciated from the preprogrammed characteristic map of FIG. 5 showing the relationship between yaw-rate-deviation threshold value εth and vehicle speed V, in a low speed range ($0 \leq V \leq V_{S1}'$) from 0 to a predetermined low speed value $V_{S1}'$, yaw-rate-deviation threshold value εth is fixed to a predetermined relatively high threshold value εthH. In a middle and high speed range ($V_{S1}' < V \leq V_{S2}'$) from the predetermined low speed value $V_{S1}'$ to a predetermined high speed value $V_{S2}'$ (higher than $V_{S1}'$), threshold value εth gradually reduces to a predetermined relatively low threshold value εthL, as the host vehicle's speed V increases. In an excessively high speed range ($V_{S2}' < V$) above predetermined high speed value $V_{S2}'$, threshold value εth is fixed to predetermined relatively low threshold value εthL. That is to say, initiation (engagement) of the VDC control is determined depending upon the comparison result of yaw-rate deviation ε and yaw-rate-deviation threshold value εth under the resetting state ($F_{VDC}=0$) of VDC control indicative flag $F_{VDC}$ indicating whether the VDC control system is operative ($F_{VDC}=1$) or inoperative ($F_{VDC}=0$). Concretely, when yaw-rate deviation ε is greater than yaw-rate-deviation threshold value εth, that is, |ε|>εth, and additionally the VDC control system is held in the inoperative state, i.e., in case of $F_{VDC}=0$, the processor of ECU 8 determines that the VDC control should be initiated or engaged. That is, the inequality |ε|>εth means that the vehicle driving stability (vehicle driveability and stability) is deteriorated. Thereafter, VDC control indicative flag $F_{VDC}$ is set to "1". If the absolute value |ε| of yaw-rate deviation ε is less than or equal to yaw-rate-deviation threshold value εth (i.e., |ε|≤εth) even under a condition of $F_{VDC}=0$, VDC control indicative flag $F_{VDC}$ is continuously maintained at "0".

When the absolute value |ε| of yaw-rate deviation ε becomes less than or equal to yaw-rate-deviation threshold value εth under a condition where VDC control indicative flag $F_{VDC}$ is set (=1), and additionally the absolute value |β| of sideslip angle β becomes less than or equal to a predetermined threshold value βth (i.e., |β|≤βth), that is, in case of $F_{VDC}=1$ and |ε|≤εth and |β|≤βth, the processor of ECU 8 determines that the VDC control system should be shifted to the inoperative state (the disengaged state), and thus VDC control indicative flag $F_{VDC}$ is reset (=0). Conversely when the condition defined by $F_{VDC}=1 \cap |\epsilon| \leq \epsilon th \cap |\beta| \leq \beta th$ is unsatisfied, VDC control indicative flag $F_{VDC}$ is maintained at "1".

When VDC control indicative flag $F_{VDC}$ is set (=1), that is, during the VDC operative state, VDC desired yaw moment MsV, corresponding to the controlled variable for VDC control, is arithmetically calculated based on yaw-rate deviation ε (=Φrh−φ') between final desired yaw rate Φrh and actual yaw rate φ', from the following expression (13).

$$MsV = Kvp \times \epsilon + Kvd \times d\epsilon \quad (13)$$

where Kvp and Kvd denote control gains, ε is equal to the difference (Φrh−φ'), and dε denotes a variation of yaw-rate deviation ε with respect to a predetermined time interval such as 50 milliseconds.

On the contrary, when VDC control indicative flag $F_{VDC}$ is reset (=0), that is, during the VDC inoperative state, VDC desired yaw moment MsV, corresponding to the controlled variable for VDC control, is set to "0". After calculation of VDC desired yaw moment MsV corresponding to the controlled variable for VDC control, the routine of FIG. 2 proceeds from step S11 to step S12.

At step S12, setting of final desired yaw moment Ms is performed depending on whether VDC control indicative flag $F_{VDC}$ is set (=1) or reset (=0). On the assumption that a higher priority is put on VDC control rather than LDP control, if the VDC control system comes into operation, LDV desired yaw moment MsL, which is calculated through step S9 and corresponds to the controlled variable of LDV control, is corrected and replaced with VDC desired yaw moment MsV, which is calculated through step S11 and corresponds to the controlled variable of VDC control. In other words, when VDC control indicative flag $F_{VDC}$ is set (i.e., $F_{VDC}=1$) and thus the VDC control has been enabled (or engaged), VDC desired yaw moment MsV is set as final desired yaw moment Ms and additionally lane-deviation decision flag $F_{LD}$ is reset to "0", that is, in case of $F_{VDC}=1$, Ms=MsV and $F_{LD}=0$. Conversely when VDC control indicative flag $F_{VDC}$ is reset (i.e., $F_{VDC}=0$) and thus the VDC control has been disabled (or disengaged), LDP desired yaw moment MsL is set as final desired yaw moment Ms, that is, in case of $F_{VDC}=0$, Ms=MsL.

At step S13, front-left, front-right, rear-left, and rear-right desired wheel-brake cylinder pressures $Ps_{FL}$, $Ps_{FR}$, $Ps_{RL}$ and $Ps_{RR}$ are calculated based on master cylinder pressure Pm read through step S1 and final desired yaw moment Ms determined through step S12.

Concretely, in case of $F_{LD}=0$ or $F_{cancel}=1$ and $F_{VDC}=0$, front-left and front-right desired wheel-brake cylinder pressures $Ps_{FL}$ and $Ps_{FR}$ for front wheel-brake cylinders 6FL and 6FR are set to master-cylinder pressure Pm (see the following expressions), whereas rear-left and rear-right desired wheel-brake cylinder pressures $Ps_{RL}$ and $Ps_{RR}$ for rear wheel-brake cylinders 6RL and 6RR are set to a rear-wheel brake pressure or a rear-wheel master-cylinder pressure Pmr (see the following expressions), which is calculated and usually reduced from master-cylinder pressure Pm, while taking into account wheel-brake cylinder pressure distribution between front and rear wheel brakes.

$Ps_{FL}=Pm$ $Ps_{FR}=Pm$ $Ps_{RL}=Pmr$ $Ps_{RR}=Pmr$

In contrast to the above, during operation of the VDC system ($F_{VDC} \neq 0$), exactly when the condition defined by $F_{LD}=0$ or $F_{cancel}=1$ and $F_{VDC}=0$ is unsatisfied, each of desired wheel-brake cylinder pressures $Ps_{FL}$, $Ps_{FR}$, $Ps_{RL}$ and $Ps_{RR}$ are calculated based on the magnitude of final desired yaw moment Ms. Concretely, when the absolute value |MS| of final desired yaw moment Ms is less than a predetermined desired yaw-moment threshold value Msth, (i.e., |Ms|<Msth), the processor of ECU 8 determines each of desired wheel-brake cylinder pressures $Ps_{FL}$–$Ps_{RR}$ in such a manner as to provide only the differential pressure between rear road wheels 5RL and 5RR. In other words, the differential pressure between front road wheels 5FL and 5FR is set to "0,". Thus, in case of |Ms|<Msth, the front desired wheel-brake cylinder pressure difference $\Delta Ps_F$ between front-left and front-right desired wheel-brake cylinder pressures $Ps_{FL}$ and $Ps_{FR}$, and the rear desired wheel-brake cylinder pressure difference $\Delta Ps_R$ between rear-left and rear-right desired wheel-brake cylinder pressures $Ps_{RL}$ and $Ps_{RR}$ are determined as follows.

$\Delta Ps_F = 0$ $\Delta Ps_R = 2 \times Kb_R \times |Ms|/T$     (14)

where $Kb_R$ denotes a predetermined conversion coefficient used to convert a rear-wheel braking force into a rear wheel-brake cylinder pressure and T denotes a rear-wheel tread (or a rear-wheel track). In the shown embodiment, the rear-wheel track T is set to be identical to a front-wheel track.

Conversely when the absolute value |MS| of final desired yaw moment Ms is greater than or equal to the predetermined threshold value Msth, (i.e., $|Ms| \geq Msth$), the processor of ECU 8 determines each of desired wheel-brake cylinder pressures $Ps_{FL}$ through $Ps_{RR}$ in such a manner as to provide both of the differential pressure between front road wheels 5FL and 5FR and the differential pressure between rear road wheels 5RL and 5RR. In this case, front and rear desired wheel-brake cylinder pressure differences $\Delta Ps_F$ and $\Delta Ps_R$ are represented by the following expressions (15) and (16).

$\Delta Ps_F = 2 \times Kb_F \times (|Ms| - Msth)/T$     (15)

$\Delta Ps_R = 2 \times Kb_R \times Msth/T$     (16)

where $Kb_F$ denotes a predetermined conversion coefficient used to convert a front-wheel braking force into a front wheel-brake cylinder pressure, $Kb_R$ denotes a predetermined conversion coefficient used to convert a rear-wheel braking force into a rear wheel-brake cylinder pressure, T of the expression (15) and T of the expression (16) denote front and rear wheel treads being the same in front and rear wheels, and Msth denotes the predetermined desired yaw-moment threshold value.

In setting front and rear desired wheel-brake cylinder pressure differences $\Delta Ps_F$ and $\Delta Ps_R$ in case of $|Ms| \geq Msth$, the system of the embodiment actually determines both of the front and rear desired brake fluid pressure differences $\Delta Ps_F$ and $\Delta Ps_R$ based on the above expressions (15) and (16). Instead of producing the desired yaw-moment controlled variable needed for VDC control or LDP control by creating both of the front and rear desired brake fluid pressure differences $\Delta Ps_F$ and $\Delta Ps_R$, the desired yaw moment may be produced by only the front desired wheel-brake cylinder pressure difference $\Delta Ps_F$. In such a case, front and rear desired wheel-brake cylinder pressure differences $\Delta Ps_F$ and $\Delta Ps_R$ are obtained from the following expressions (17).

$\Delta Ps_R = 0$ $\Delta Ps_F = 2 \cdot Kb_F \cdot |Ms|/T$     (17)

Therefore, when final desired yaw moment Ms is a negative value (Ms<0), in other words, the host vehicle tends to deviate from the current driving lane to the left, in order to produce the component of yaw moment vector needed to rotate the host vehicle to the right, front-left desired wheel-brake cylinder pressure $Ps_{FL}$ is set to master-cylinder pressure Pm, front-right desired wheel-brake cylinder pressure $Ps_{FR}$ is set to the sum (Pm+$\Delta Ps_F$) of master-cylinder pressure Pm and front desired wheel-brake cylinder pressure difference $\Delta Ps_F$, rear-left desired wheel-brake cylinder pressure $Ps_{RL}$ is set to rear-wheel master-cylinder pressure Pmr, and rear-right desired wheel-brake cylinder pressure $Ps_{RR}$ is set to the sum (Pmr+$\Delta Ps_R$) of rear-wheel master-cylinder pressure Pmr and rear desired wheel-brake cylinder pressure difference $\Delta Ps_R$ (see the following expression (18)).

$Ps_{FL} = Pm$ $Ps_{FR} = Pm + \Delta Ps_F$ $Ps_{RL} = Pmr$ $Ps_{RR} = Pmr + \Delta Ps_R$     (18)

On the contrary, when final desired yaw moment Ms is a positive value (Ms≧0), in other words, the host vehicle tends to deviate from the current driving lane to the right, in order to produce the component of yaw moment vector needed to rotate the host vehicle to the left, front-left desired wheel-brake cylinder pressure $Ps_{FL}$ is set to the sum (Pm+$\Delta Ps_F$) of master-cylinder pressure Pm and front desired wheel-brake cylinder pressure difference $\Delta Ps_F$, front-right desired wheel-brake cylinder pressure $Ps_{FR}$ is set to master-cylinder pressure Pm, rear-left desired wheel-brake cylinder pressure $Ps_{RL}$ is set to the sum (Pmr+$\Delta Ps_R$) of rear-wheel master-cylinder pressure Pmr and rear desired wheel-brake cylinder pressure difference $\Delta Ps_R$, and rear-right desired wheel-brake cylinder pressure $Ps_{RR}$ is set to rear-wheel master-cylinder pressure Pmr (see the following expression (19)).

$Ps_{FL} = Pm + \Delta Ps_F$ $Ps_{FR} = Pm$ $Ps_{RL} = Pmr + \Delta Ps_R$ $Ps_{RR} = Pmr$     (19)

Thereafter, at step S14, a desired driving torque Trqds is arithmetically calculated as detailed hereunder, under a particular condition where there is a possibility that the host vehicle tends to deviate from the current driving lane and the LDP control is operative ($F_{LD} \neq 0$). In the shown embodiment, under the specified condition defined by $F_{LD} \neq 0$ and $F_{cancel} = 0$, vehicle acceleration is reduced or suppressed by decreasingly compensating for the engine output even when the accelerator pedal is depressed by the driver. Concretely, in case of $F_{LD} \neq 0$ and $F_{cancel} = 0$, desired driving torque Trqds is calculated from the following expression.

$Trqds = f(Acc) - g(Ps)$ where f(Acc) is a function of accelerator opening Acc read through step S1 and the function f(Acc) is provided to calculate a desired driving torque that is determined based on the accelerator opening Acc and required to accelerate the host vehicle, and g(Ps) is a function of a sum Ps (=$\Delta Ps_F$+$\Delta Ps_R$) of front and rear desired wheel-brake cylinder pressure differences $\Delta Ps_F$ and $\Delta Ps_R$ to be produced during the yaw moment control (VDC control or LDP control), and the function g(Ps) is provided to calculate a desired braking torque that is determined based on the summed desired wheel-brake cylinder pressure differences Ps.

Therefore, when the flags $F_{LD}$ and $F_{cancel}$ are conditioned in the states defined by $F_{LD} \neq 0$ (that is, $F_{LD} = 1$ or $-1$) and $F_{cancel} = 0$, and thus the LDP control is executed, the engine torque output is reduced by the braking torque created based on the summed desired wheel-brake cylinder pressure differences Ps (=$\Delta Ps_F + \Delta Ps_R$).

On the contrary, the flags $F_{LD}$ and $F_{cancel}$ are conditioned in the states defined by $F_{LD} = 0$ and/or $F_{cancel} = 1$, desired driving torque Trqds is determined based on only the driving torque component needed to accelerate the host vehicle (see the following expression).

Trqds=f(Acc)

At step S15, command signals corresponding to front-left, front-right, rear-left, and rear-right desired wheel-brake cylinder pressures $Ps_{FL}$, $Ps_{FR}$, $Ps_{RL}$, and $Ps_{RR}$, calculated through step S13, are output from the input interface of ECU 8 to hydraulic modulator 7, and at the same time a command signal corresponding to desired driving torque Trqds, calculated through step S14, is output from the output interface of ECU 8 to driving torque control unit 12. In this manner, one cycle of the time-triggered interrupt routine (the yaw moment control routine executed by the system of the embodiment shown in FIGS. 1–5) terminates and the predetermined main program is returned. In the control routine of FIG. 2, the arithmetic and/or logic operations of steps S1, S2, S3, and S11 serve as a driving stability decision means. The arithmetic and/or logic operations of steps S4 through S9 serve as a lane deviation prevention (LDP) means. The process of step S10 serves as a driving stability decision compensation means. The processes of steps S12 through S15 correspond to a yawing-motion control means or a braking/driving force control means. The system of the embodiment discussed above operates as follows.

With the previously-discussed arrangement, when the absolute value |XS| of lane-deviation estimate XS becomes greater than or equal to predetermined lane-deviation criterion $X_C$ with no driver's intention for lane changing, ECU 8 determines that the host vehicle is in a lane-deviation state and thus there is an increased tendency for the host vehicle to deviate from the current host vehicle's driving lane (see step S7). Therefore, LDP desired yaw moment MsL (corresponding to the controlled variable for LDP control) is calculated based on the difference (|XS|–$X_C$) (see the expression (11) and step S9). Then, on the assumption that a higher priority is put on VDC control rather than LDP control, VDC desired yaw rate φr* is compensated for based on LDP desired yaw moment MsL corresponding to the controlled variable of LDP control to produce final desired yaw rate Φrh (=φr*+Kfh×MsL), compensated for based on LDP desired yaw moment MsL, only when the VDC control system is conditioned in its inoperative state (see the expression (12) and step S10). After this, when yaw-rate deviation ε (=Φrh–φ') between final desired yaw rate Φrh and actual yaw rate φ' exceeds yaw-rate-deviation threshold value εth, ECU 8 determines that VDC control should be initiated to enhance the driving stability. Therefore, VDC desired yaw moment MsV (corresponding to the controlled variable for VDC control) is arithmetically calculated based on yaw-rate deviation ε (=Φrh–φ') (see the expression (13) and step S11). When VDC control indicative flag $F_{VDC}$ is set (i.e., $F_{VDC}$=1) and thus the VDC control has been enabled (or engaged) in such a manner as to put a higher priority on VDC control rather than LDP control, VDC desired yaw moment MsV is set as final desired yaw moment Ms. Conversely when VDC control indicative flag $F_{VDC}$ is reset (i.e., $F_{VDC}$=0) and thus the VDC control has been disabled (or disengaged), LDP desired yaw moment MsL is set as final desired yaw moment Ms. Thereafter, braking forces, that is, wheel-brake cylinder pressures for front and rear road wheels 5FL, 5FR, 5RL, and 5RR are controlled in a manner so as to achieve the calculated final desired yaw moment Ms. The system of the embodiment operates as follows.

Figure 6A:
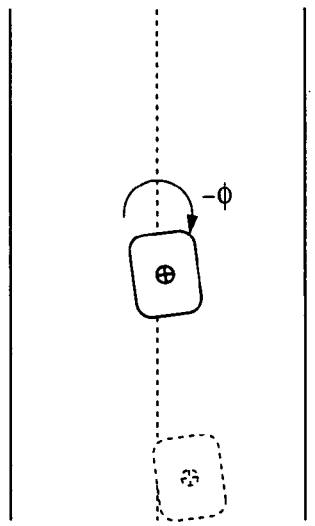
Figure 6A:
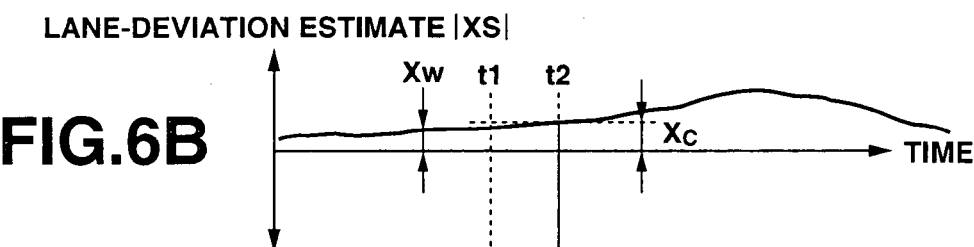
Figure 6A:
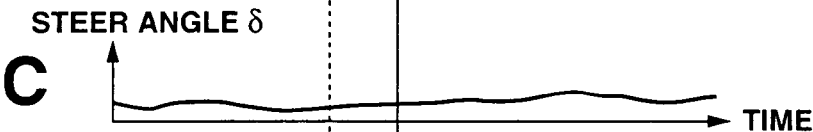
Figure 6A:
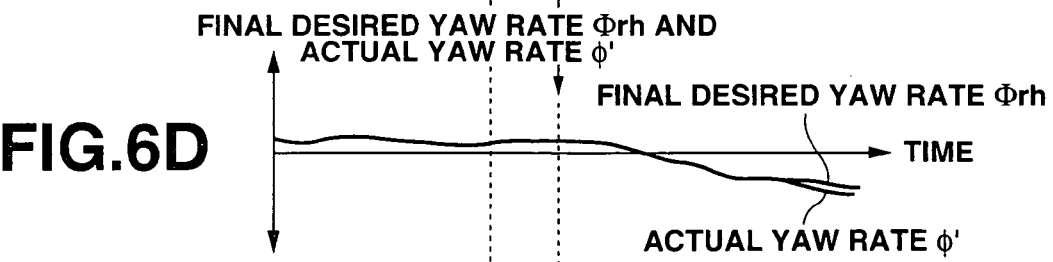

As shown in FIGS. 6A–6E, suppose that the host vehicle is traveling on a left-hand traffic passing lane under a particular condition where VDC control indicative flag $F_{VDC}$ is reset to "0" and the VDC control system is conditioned in the inoperative state (see the host vehicle indicated by the phantom line in FIG. 6A). Assume that the host vehicle tends to deviate from the current driving lane to the adjacent left-hand side traffic lane, going across the left-hand white lane marking such as the left-hand white line. Under this condition, if no signal from direction indicator switch 20 is output and there is no driver's intention for lane changing, warning system 23 comes into operation at a time t1 with a slight time delay from a time when the absolute value |XS| of lane-deviation estimate XS is greater than or equal to predetermined alarm criterion threshold value $X_W$ (see FIG. 6B). Thus, alarm signal AL is output from the output interface of ECU 8 to warning system 23 and thus the visual and/or audible warning for the increased host vehicle's lane-deviation tendency is signaled to the driver. Thereafter, owing to a further increase in the positive lane-deviation estimate XS from predetermined alarm criterion threshold value $X_W$, the host vehicle shifts to the deviated position as indicated by the solid line in FIG. 6A, while going across the white marking line. At a time t2 when the absolute value |XS| of lane-deviation estimate XS becomes greater than or equal to the positive lane-deviation criterion $X_C$ (see FIG. 6B), ECU 8 determines that there is an increased tendency for the host vehicle to deviate from the current traffic lane to the left. Thus, lane-changing indicative flag $F_{LC}$ is reset to "0", since direction indicator switch 20 is not manipulated by the driver. At the same time, lane-deviation decision flag $F_{LD}$ is set to "+1", because of the host vehicle's deviation to the left. Additionally, if the rate of fluctuation of lane-deviation estimate XS is small, that is, in case of |$XS_{(n-1)}$–$XS_{(n)}$|<$L_{XS}$, LDP control inhibiting flag $F_{cancel}$ is reset to "0" (see step S8 of FIG. 2). On the basis of the difference |XS|–$X_C$, a negative LDP desired yaw moment MsL (a negative LDP controlled variable) is calculated (see the expression (11) and step S9 of FIG. 2). On the other hand, in the vehicle dynamics control system, reference desired yaw rate φr' is first computed, retrieved and determined based on steer angle δ and host vehicle's speed V. After this, reference desired yaw rate φr' is compensated for based on the latest up-to-date data of lateral acceleration Yg (see the expression (1)) to compute desired yaw rate correction value φrh'. That is, the smaller the lateral acceleration Yg, in other words, the smaller the road-surface friction coefficient, the desired yaw rate is limited to a smaller value. Furthermore, reference desired yaw rate φr', exactly, desired yaw rate correction value φrh' is compensated for based on the deviation dB (=β–βr) between actual sideslip angle β and desired sideslip angle βr and a variation ddB of sideslip-angle deviation dB. In other words, the desired yaw rate is decreasingly compensated for in such a manner as to decrease by a value corresponding to the sum of sideslip-angle deviation dB and the variation ddB of sideslip-angle deviation dB with respect to the predetermined time interval (see the expression (8)). As described previously, under the condition where the VDC control system is conditioned in the inoperative state and thus the VDC control is disengaged (i.e., $F_{VDC}$=0), the calculated VDC desired yaw rate φr* itself is not used as the final desired yaw rate, because VDC desired yaw rate φr* is used as the final desired yaw rate only when the VDC control system is conditioned in the operative state and thus the VDC control is engaged (i.e., $F_{VDC}$=1). Instead thereof, final desired yaw rate Φrh is calculated by adding the product (Kfh×MsL) of the negative LDP desired yaw moment MsL and the correction gain Kfh to VDC desired yaw rate φr* (see the expression (12)), and the compensated desired yaw rate φr*−|Kfh×MsL| (={φr*−|Kfh×MsL|}<φr*), compensated for based on the negative LDP desired yaw moment MsL, is used as final desired yaw rate Φrh. That is, final desired yaw rate Φrh can be set to a comparatively small value, which is obtained by subtracting the absolute value |Kfh×MsL| of the product (Kfh×MsL) from VDC desired yaw rate φr*. Therefore, the yaw-rate deviation ε (=Φrh−φ') between final desired yaw rate Φrh and actual yaw rate φ' becomes less than or equal to yaw-rate-deviation threshold value εth, that is, |ε|≦εth. Thus, the resetting state ($F_{VDC}$=0) of VDC control indicative flag $F_{VDC}$ can be continued. Due to VDC control indicative flag $F_{VDC}$ continuously held at "0", VDC desired yaw moment MsV is set or adjusted to "0" (see step S11), and simultaneously the LDP desired yaw moment MsL, which is computed as a negative value within the LDP control system, is determined as final desired yaw moment Ms (see step S12). Under the condition of Ms=MsL, that is, when final desired yaw moment Ms is determined as the negative value (the negative LDP desired yaw moment MsL), front and rear desired wheel-brake cylinder pressures $Ps_{FL}$, $Ps_{FR}$, $Ps_{RL}$ and $Ps_{RR}$ are calculated or determined based on the expression (18) of step S13 discussed above. Thereafter, desired driving torque Trqds is calculated based on accelerator opening Acc (see step S14). And then, command signals corresponding to front and rear desired wheel-brake cylinder pressures $Ps_{FL}$, $Ps_{FR}$, $Ps_{RL}$, and $Ps_{RR}$, calculated through step S13, are output from ECU 8 to hydraulic modulator 7, and at the same time a command signal corresponding to desired driving torque Trqds, calculated through step S14, is output from ECU 8 to driving torque control unit 12. As a result of this, the right-hand side wheel-brake cylinder pressure is set to be relatively greater than the left-hand side wheel-brake cylinder pressure (see the expression (18)), and whereby a yawing moment, which acts to rotate the host vehicle clockwise (to the right), is produced, and thus the increased host vehicle's lane-deviation tendency to the left can be effectively suppressed or avoided. In this manner, when the negative LDP desired yaw moment MsL (a component of the moment vector tending to rotate the host vehicle about the z-axis clockwise (to the right)) is determined as final desired yaw moment Ms and therefore the LDP control is initiated, as shown in FIG. 6D, the actual yaw rate φ' tends to drop in the negative yaw-rate direction, but at early stages of LDP control the final desired yaw rate Φrh is determined as a comparatively small value (φr*−|Kfh×MsL|), which is obtained by subtracting the absolute value |Kfh×MsL| of the product (Kfh×MsL) from VDC desired yaw rate φr*, since the VDC control system is continuously maintained at the inoperative state ($F_{VDC}$=0). Therefore, as shown in FIG. 6D, final desired yaw rate Φrh, which is compensated for based on the negative LDP desired yaw moment MsL, tends to drop, while following a drop in actual yaw rate φ'. Thus, the absolute value |ε| of yaw-rate deviation ε (=Φrh−φ') between final desired yaw rate Φrh and actual yaw rate φ' is continuously maintained at a value less than or equal to yaw-rate-deviation threshold value εth, that is, |ε|≦εth. As a consequence, VDC control indicative flag $F_{VDC}$ can be continuously held at the resetting state, even when a yaw moment or a yaw rate is produced and changed owing to LDP control without any steering operation. This effectively certainly avoids such an undesirable engagement or malfunction for VDC control, occurring due to the yaw moment (yaw rate) produced and changed owing to LDP control. Thus, the front desired wheel-brake cylinder pressure difference $\Delta Ps_F$ for LDP control is precisely controlled in accordance with the control command from the LDP control system (see a stable change in front desired wheel-brake cylinder pressure difference $\Delta Ps_F$ shown in FIG. 6E). This ensures a stable lane deviation prevention control mode.

In contrast with the system of the embodiment, capable of executing the yaw-motion control operation shown in FIGS. 6A–6E, the operation of the system permanently using the uncompensated desired yaw rate (i.e., VDC desired yaw rate φr*) as final desired yaw rate Φrh is briefly explained hereunder in reference to the time charts shown in FIGS. 7A–7E.

Figure 7A:
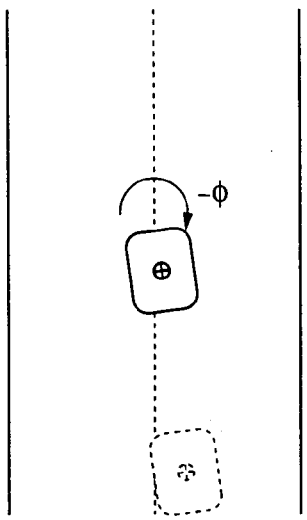
FIGS. 7A–7E are time charts explaining the operation of a vehicle dynamics control apparatus using the uncompensated VDC desired yaw rate $\phi r^*$ ($\Phi rh = \phi r^*$) as final desired yaw rate $\Phi rh$, and respectively show variations in the absolute value |XS| of lane-deviation estimate XS, steering angle δ, uncompensated VDC desired yaw rate $\phi r^*$ ($\Phi rh = \phi r^*$) and actual yaw rate $\phi'$, and front desired wheel-brake cylinder pressure difference $\Delta Ps_F$.
Figure 7B:
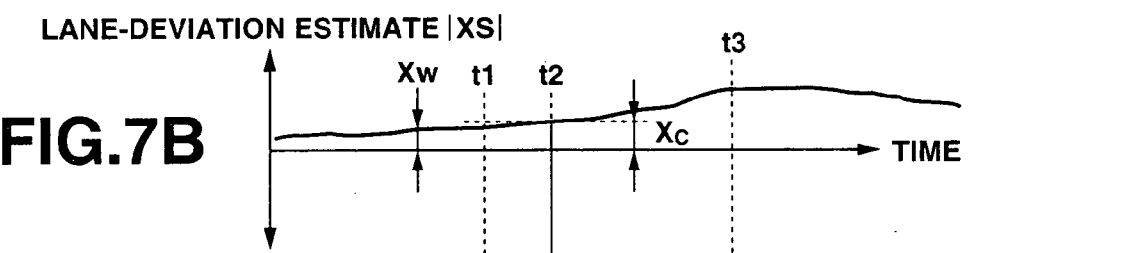
Figure 7C:
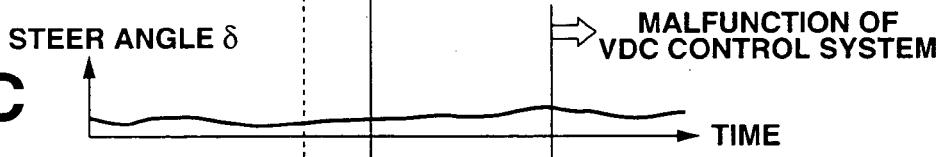
Figure 7D:
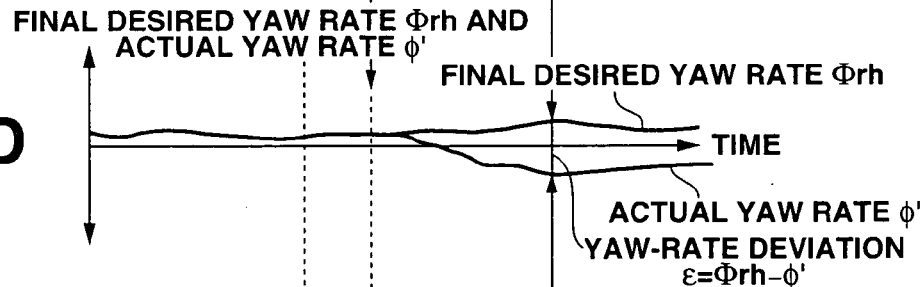
Figure 7E:
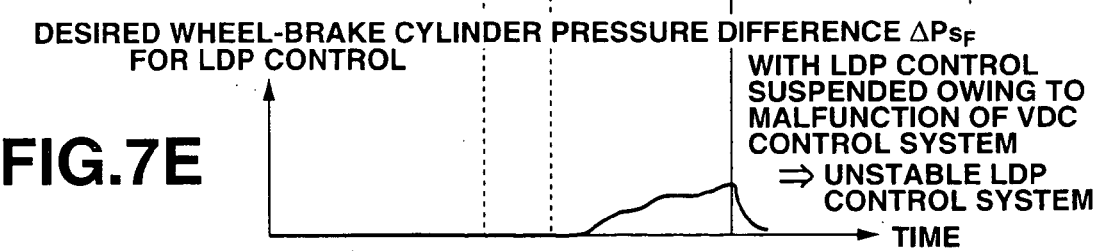

In case of the system permanently setting the uncompensated desired yaw rate (i.e., VDC desired yaw rate φr*) to final desired yaw rate Φrh, as a matter of course, VDC desired yaw rate φr* itself is permanently used as the final desired yaw rate and thus final desired yaw rate Φrh tends to vary within a positive yaw-rate range even when the LDP control is initiated (see FIG. 7D). As a result of this, yaw-rate deviation ε (=Φrh−φ') between final desired yaw rate Φrh and actual yaw rate φ' tends to increase. As can be seen from the time chart of FIG. 7D, when the absolute value |ε| of yaw-rate deviation ε exceeds yaw-rate-deviation threshold value εth at a time t3, VDC control indicative flag $F_{VDC}$ is set to "1" owing to the condition of |ε|>εth, and as a result the VDC control system comes into operation and the VDC control is engaged. Due to such initiation of the VDC control, the front desired wheel-brake cylinder pressure difference ΔPs, calculated for avoiding the increased host vehicle's lane-deviation tendency during the LDP control for LDP control, tends to undesirably reduce (see the drop in front desired wheel-brake cylinder pressure difference ΔPs in FIG. 7D). That is, the controlled variable of LDP control is suppressed by the controlled variable of VDC control due to the mutual interference between LDP control and VDC control. This deteriorates the LDP-control accuracy and the LDP-control-system stability.

As can be appreciated from comparison between the system of the embodiment using the compensated desired yaw rate φr*+Kfh×MsL as final desired yaw rate Φrh during the VDC inoperative state $F_{VDC}$=0 (see FIGS. 6A–6E) and the system permanently using the uncompensated desired yaw rate (i.e., VDC desired yaw rate φr*) as final desired yaw rate Φrh irrespective of setting or resetting of VDC control indicative flag $F_{VDC}$ (see FIGS. 7A–7E), according to the system of the embodiment, when the lane deviation prevention control is initiated under a condition where the vehicle dynamics control system is inoperative ($F_{VDC}$=0), the compensated desired yaw rate φr*+Kfh×MsL, compensated for based on LDP desired yaw moment MsL, is used as final desired yaw rate Φrh, thus certainly avoiding undesirable engagement or malfunction for VDC control, occurring due to the yaw moment produced and changed owing to LDP control. In other words, a timing of initiation of VDC control is effectively compensated for and retarded by softening the criterion (|ε|<εth), which is used to determine the driving stability, based on LDP desired yaw moment MsL (the controlled variable of LDP control), when the lane deviation prevention control is operative and the vehicle dynamics control is inoperative. In the system executing the control routine of FIG. 2, softening the criterion (|ε|>εth) means decreasingly compensating for yaw-rate deviation ε. Alternatively, as discussed later, softening the criterion may be achieved by changing or increasingly compensating for the other of yaw-rate-deviation threshold value εth and yaw-rate deviation ε, that is, threshold value εth itself, based on LDP desired yaw moment MsL (see FIG. 9).

Figure 8:
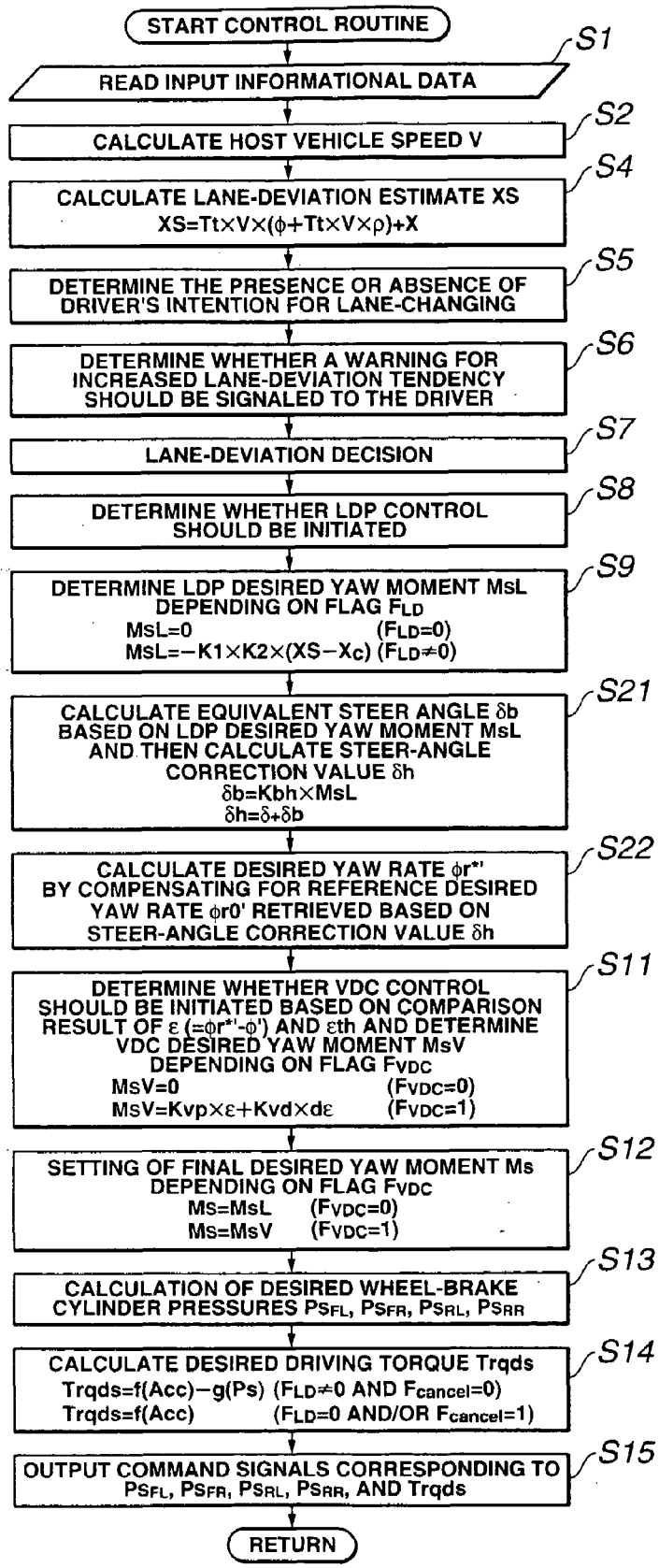
FIG. 8 is a flow chart showing a modified control routine (modified arithmetic and logic operations) executed within the braking/driving force control unit incorporated in the vehicle dynamics control apparatus of the embodiment.

Referring now to FIG. 8, there is shown a modified yawing-motion control routine executed within the processor of ECU 8 of the vehicle dynamics control apparatus of the embodiment. The modified control routine shown in FIG. 8 is also executed as time-triggered interrupt routines to be triggered every predetermined sampling time intervals such as 10 milliseconds. The modified control routine of FIG. 8 is similar to the control routine of FIG. 2, except that steps S3 and S10 included in the routine shown in FIG. 2 are replaced with steps S21 and S22 included in the routine shown in FIG. 8. Thus, the same step numbers used to designate steps in the routine shown in FIG. 2 will be applied to the corresponding step numbers used in the modified control routine shown in FIG. 8, for the purpose of comparison of the two different interrupt routines. Steps S21 and S22 will be hereinafter described in detail with reference to the accompanying drawings, while detailed description of steps S1–S2, S4–S9, S11–S15 will be omitted because the above description thereon seems to be self-explanatory.

As described previously, according to the first control routine shown in FIG. 2, VDC desired yaw rate $\phi r^*$ is compensated for based on LDP desired yaw moment MsL (see steps S9 and S10). In contrast to the above, according to the modified control routine shown in FIG. 8, a VDC desired yaw rate $\phi r^{*\prime}$ (a final desired yaw rate) of the modified yawing-motion control system is computed or determined or map-retrieved by using a compensated steered amount or a steer-angle correction value $\delta h$ (=$\delta$+$\delta b$=$\delta$+$Kbh \times MsL$), described hereunder in detail.

Concretely, subsequently to step S9, step S21 occurs.

At step S21, an equivalent steered amount $\delta b$ is arithmetically calculated or estimated based on LDP desired yaw moment MsL, calculated through step S9 and corresponding to the controlled variable of LDP control, from the following expression (20). Equivalent steered amount $\delta b$ means an equivalent steer angle substantially corresponding to LDP desired yaw moment MsL needed for lane-deviation avoidance.

$$\delta b = Kbh \times MsL \tag{20}$$

where Kbh denotes a constant that is determined by specifications of the host vehicle and arithmetically calculated from an expression (22) described later.

Additionally, at step S21, steer-angle correction value $\delta h$ is arithmetically calculated by adding equivalent steered amount $\delta b$ to an actual steered amount, i.e., steer angle $\delta$ (see the following expression (21)).

$$\delta h = \delta + \delta b \tag{21}$$

$$Kbh = Nstr/(Cpf \times Lf) \tag{22}$$

where Nstr denotes a steering gear ratio, Lf denotes a distance from the center of gravity of the host vehicle to the front axle, and Cpf denotes a cornering power of the front wheel.

In the modified system shown in FIG. 8, at step S22, first, reference desired yaw rate $\phi r'$ is map-retrieved based on steer-angle correction value $\delta h$ (=$\delta$+$\delta b$) instead of directly using steer angle $\delta$, from the predetermined V–$\delta$–$\phi r'$ (V–$\delta h$–$\phi r'$) characteristic map shown in FIG. 3. Note that the steer-angle component (that is, equivalent steered amount $\delta b$) equivalent to a component (LDP desired yaw moment MsL) of the moment vector for lane-deviation avoidance is reflected within steered amount correction value $\delta h$ (=$\delta$+$\delta b$). Second, reference desired yaw rate $\phi r'$, reflecting LDP desired yaw moment MsL, is further compensated for based on the road-surface friction coefficient $\mu$, in other words, the lateral acceleration exerted on the host vehicle, so as to derive the friction-coefficient dependent desired yaw rate correction value $\phi rh'$. Then, sideslip angle $\beta$ is arithmetically calculated from the following expression (4), i.e., $\beta = d\beta + \beta_0$, and simultaneously desired sideslip angle $\beta r$ is arithmetically calculated based on desired yaw rate correction value $\phi rh'$ from the expressions (5) and (6). Finally, VDC desired yaw rate $\phi r^{*\prime}$ (the final desired yaw rate) of the modified yawing-motion control system is calculated by further compensating for desired yaw rate correction value $\phi rh'$ based on the actual sideslip angle $\beta$ and desired sideslip angle $\beta r$, from the expression (8), i.e., $\phi r^{*\prime} = \phi rh' - (Kbp \times dB + Kbd \times ddB)$. As discussed above, according to the modified system of FIG. 8, the component (LDP desired yaw moment MsL) of the moment vector for lane-deviation avoidance has already been reflected in the calculated VDC desired yaw rate $\phi r^{*\prime}$. Thus, the calculated VDC desired yaw rate $\phi r^{*\prime}$, obtained through steps S21 and S22 of the modified yawing-motion control system of FIG. 8, is equivalent to final desired yaw rate $\Phi rh$ (=$\phi r^* + Kfh \times MsL$), obtained through steps S3 and S10 of the first yawing-motion control system of FIG. 2. Subsequently to step S22, step S11 occurs. At step S11, VDC desired yaw moment MsV is arithmetically calculated depending on both of the yaw-rate deviation $\epsilon$ and VDC control indicative flag $F_{VDC}$. In the modified system of FIG. 8, note that yaw-rate deviation $\epsilon$ is calculated as the difference ($\phi r^{*\prime} - \phi'$) between the calculated VDC desired yaw rate $\phi r^{*\prime}$ and actual yaw rate $\phi'$. Thus, in case of $F_{VDC} = 0$, VDC desired yaw moment MsV, corresponding to the controlled variable for VDC control, is arithmetically calculated based on yaw-rate deviation $\epsilon$ (=$\phi r^{*\prime} - \phi'$) between the calculated VDC desired yaw rate $\phi r^{*\prime}$ and actual yaw rate $\phi'$, from the following expression.

$$MsV = Kvp \times \epsilon + Kvd \times d\epsilon$$

where Kvp and Kvd denote control gains, $\epsilon$ is equal to the difference ($\phi r^{*\prime} - \phi'$), and $d\epsilon$ denotes a variation of yaw-rate deviation $\epsilon$ with respect to a predetermined time interval such as 50 milliseconds.

In the control routine of FIG. 2, the arithmetic and/or logic operations of steps S1, S2, S22 and S11 serve as a driving stability decision means. The arithmetic and/or logic operations of steps S4 through S9 serve as a lane deviation prevention (LDP) means. The process of steps S21 serves as a driving stability decision compensation means. The processes of steps S12 through S15 correspond to a yawing-motion control means or a braking/driving force control means. Therefore, the modified yawing-motion control system of FIG. 8 can provide the same effects as the first yawing-motion control system of FIG. 2, that is, prevention of undesirable engagement or malfunction for VDC control, occurring due to the yaw moment (yaw rate) produced and changed owing to LDP control, when the LDP control is initiated under a condition where the vehicle dynamics control system is inoperative ($F_{VDC} = 0$), since the criterion for initiation of the vehicle dynamics control, that is, the final desired yaw rate $\phi r^{*\prime}$, exactly, yaw-rate deviation $\epsilon$ (=$\phi r^{*\prime} - \phi'$) compared to yaw-rate-deviation threshold value $\epsilon th$, is compensated for in a manner so as to certainly reflect LDP desired yaw moment MsL for lane-deviation avoidance. For the reasons set out above, in the same manner as the yawing-motion control system of FIG. 2, the control system of FIG. 8 ensures a stable lane deviation prevention control mode, while certainly preventing undesirable engagement or malfunction for VDC control, occurring due to the yaw moment produced and changed owing to LDP control.

Figure 9:
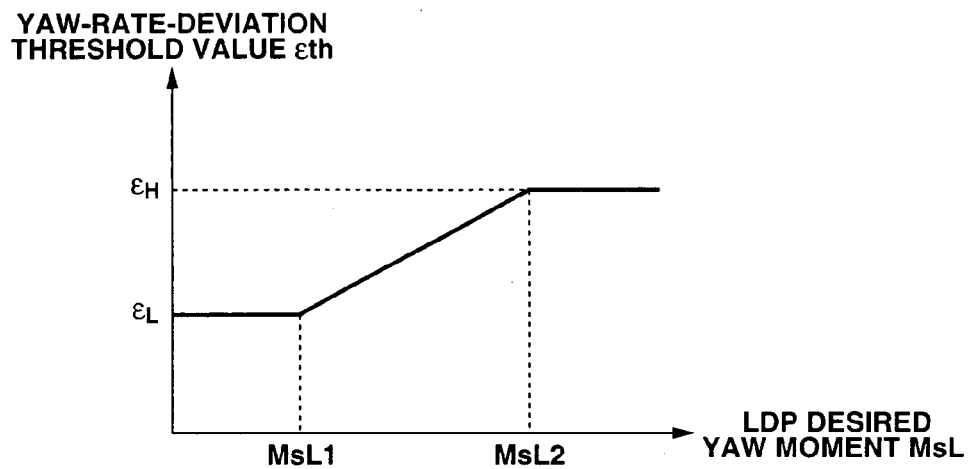
FIG. 9 is a predetermined LDP desired yaw moment MsL versus yaw-rate-deviation threshold value εth characteristic map.

As discussed above, in the control system shown in FIG. 2 VDC desired yaw rate $\phi r^*$ is compensated for based on LDP desired yaw moment MsL, whereas in the control system shown in FIG. 8 steer angle $\delta$ itself is compensated for in a manner so as to reflect LDP desired yaw moment MsL. Instead of compensating for VDC desired yaw rate $\phi r^*$ or steer angle $\delta$ on the basis of LDP desired yaw moment MsL in order to properly change the criterion for initiation (engagement) of the VDC control, yaw-rate-deviation threshold value $\epsilon$th itself may be variably determined or increasingly compensated for based on LDP desired yaw moment MsL rather than host vehicle speed V (compare the preprogrammed host vehicle's speed V versus yaw-rate-deviation threshold value $\epsilon$th characteristic map shown in FIG. 5 and the preprogrammed LDP desired yaw moment MsL versus yaw-rate-deviation threshold value $\epsilon$th characteristic map shown in FIG. 9). Compensating for yaw-rate-deviation threshold value $\epsilon$th based on LDP desired yaw moment MsL realizes the same effects as the yawing-motion control systems of FIGS. 2 and 8, namely prevention of undesirable engagement or malfunction for VDC control, which may occur due to the yaw moment produced and changed owing to LDP control. As can be appreciated from the preprogrammed characteristic map of FIG. 9 showing the relationship between yaw-rate-deviation threshold value $\epsilon$th and LDP desired yaw moment MsL, in a small LDP desired yaw moment MsL range ($0 \leq MsL \leq MsL1$) from 0 to a predetermined small LDP desired yaw moment MsL1, yaw-rate-deviation threshold value $\epsilon$th is fixed to a predetermined relatively low threshold value $\epsilon$L. In a middle and high LDP desired yaw moment MsL range (MsL1<MsL$\leq$MsL2) from the predetermined small LDP desired yaw moment MsL1 to a predetermined high LDP desired yaw moment MsL2 (higher than MsL1), threshold value $\epsilon$th gradually increases to a predetermined relatively high threshold value $\epsilon$H, as the LDP desired yaw moment MsL increases. In an excessively high LDP desired yaw moment MsL range (MsL2<MsL) above predetermined high LDP desired yaw moment MsL2, threshold value $\epsilon$th is fixed to predetermined relatively high threshold value $\epsilon$H.

Figure 10:
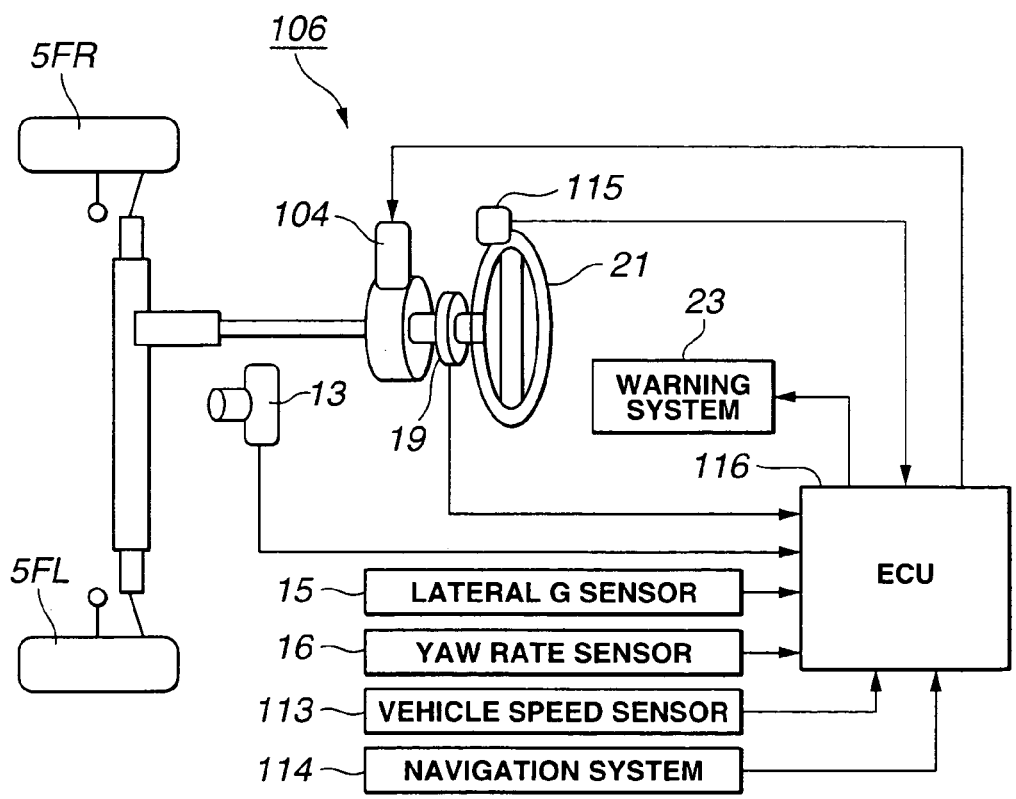
FIG. 10 is a system block diagram illustrating a modification of a vehicle dynamics control apparatus enabling a VDC function and an LDP function.

In the yawing-motion control systems of FIGS. 2 and 8, predetermined lane-deviation criterion $X_C$ is fixed to a predetermined constant value. Actually, a lane width L of each of driving lanes is not fixed constant. Thus, predetermined lane-deviation criterion $X_C$ may be a variable, which is determined depending on lane width L of each of driving lanes. FIG. 10 shows a modified vehicle dynamics control apparatus 106 enabling a VDC function and an LDP function. In FIG. 10, for the purpose of simplification of the disclosure, the same reference signs used to designate elements in the embodiment shown in FIGS. 1 and 2 will be applied to the corresponding elements used in the modified vehicle dynamics control apparatus of FIG. 10, while detailed description of the same reference signs will be omitted because the above description thereon seems to be self-explanatory. In FIG. 10, reference sign 104 denotes a steering actuator, reference sign 113 denotes a vehicle speed sensor, reference sign 114 denotes a navigation system, reference sign 115 denotes a steering wheel rotation angle sensor, and 116 denotes an electronic control unit (ECU). As shown in FIG. 10, the lane width L itself can be obtained by image-processing the image data from CCD camera 13 or by extracting input information regarding the lane width of the current driving lane as map data, utilizing navigation system 114. In this case, predetermined lane-deviation criterion $X_C$, which is a variable, can be calculated from the following expression (23).

$$X_C = min\{(L/2 - Lc/2), 0.8\} \quad (23)$$

where Lc denotes a host vehicle's width and L denotes a lane width. As can be appreciated from the above expression (23), predetermined lane-deviation criterion $X_C$ is obtained as a lower one of the value (L/2−Lc/2) and 0.8 by way of a so-called select-LOW process.

In lieu thereof, in case of an automated highway equipped with an infrastructure, a distance data (L/2−XS), which is obtained and received by way of mutual communication between the host vehicle and the on-road network (or the on-road sensor) contained in the infrastructure, may be used as input information regarding an estimate of predetermined lane-deviation criterion $X_C$.

The final desired yaw moment Ms of yawing-motion control system of the embodiment is determined on the assumption that a higher priority is put on VDC control rather than LDP control. In lieu thereof, final desired yaw moment Ms is determined depending on whether the sign of LDP desired yaw moment MsL, calculated through steps S9 or S22, is identical to the sign of VDC desired yaw moment MsV, calculated through step S11. Concretely, when the direction of yawing motion created by VDC control (that is, the sign of VDC desired yaw moment MsV) is opposite to the direction of yawing motion created by LDP control (that is, the sign of LDP desired yaw moment MsL), a higher priority is put on VDC control rather than LDP control and thus VDC desired yaw moment MsV corresponding to the controlled variable of VDC control is determined as final desired yaw moment Ms. On the contrary, when the direction of yawing motion created by VDC control (that is, the sign of VDC desired yaw moment MsV) is identical to the direction of yawing motion created by LDP control (that is, the sign of LDP desired yaw moment MsL), in order to prevent over-control, while keeping the effects obtained by both of the VDC control and the LDP control, final desired yaw moment Ms is determined as a higher one of the absolute value |MsV| of VDC desired yaw rate MsV and the absolute value |MsL| of LDP desired yaw rate MsL by way of a so-called select-HIGH process shown in the following expression (24).

$$Ms = max(|MsV|, |MsL|) \quad (24)$$

As can be appreciated from the above expression (24), when either one of VDC desired yaw rate MsV and LDP desired yaw rate MsL is "0", the nonzero desired yaw rate of desired yaw rates MsV and MsL is selected or determined as final desired yaw moment Ms.

In the modification discussed above, final desired yaw moment Ms is determined by way of the select-HIGH process Ms=max(|MsV|, |MsL|) under a condition where the direction of yawing motion created by VDC control (that is, the sign of VDC desired yaw moment MsV) is identical to the direction of yawing motion created by LDP control (that is, the sign of LDP desired yaw moment MsL). In lieu thereof, final desired yaw moment Ms may be determined, taking into account a summed desired yaw moment $Ms_{sum}$ (=MsV+MsL) of VDC desired yaw moment MsV and LDP desired yaw moment MsL and a yaw-moment controlled variable upper limit Mslim, which is determined depending on the host vehicle's turning degree, in other words, the degree of yawing motion, which is generally estimated by actual yaw rate $\phi'$ detected by yaw rate sensor 16 (functioning as the driving condition detection means), which also serves as a host vehicle's turning degree detection means. Concretely, as can be seen from the preprogrammed actual yaw rate φ' versus yaw-moment controlled variable upper limit Mslim characteristic map shown in FIG. 11, yaw-moment controlled variable upper limit Mslim is determined or map-retrieved based on actual yaw rate φ'. To provide a limiter for the upper limit of final desired yaw rate Ms, final desired yaw rate Ms may be determined as a smaller one of the summed desired yaw moment $Ms_{sum}$ (=MsV+MsL) and yaw-moment controlled variable upper limit Mslim by way of a select-LOW process shown in the following expression (25).

$$Ms=\min(|MsV+MsL|, Mslim) \quad (25)$$

Figure 11:
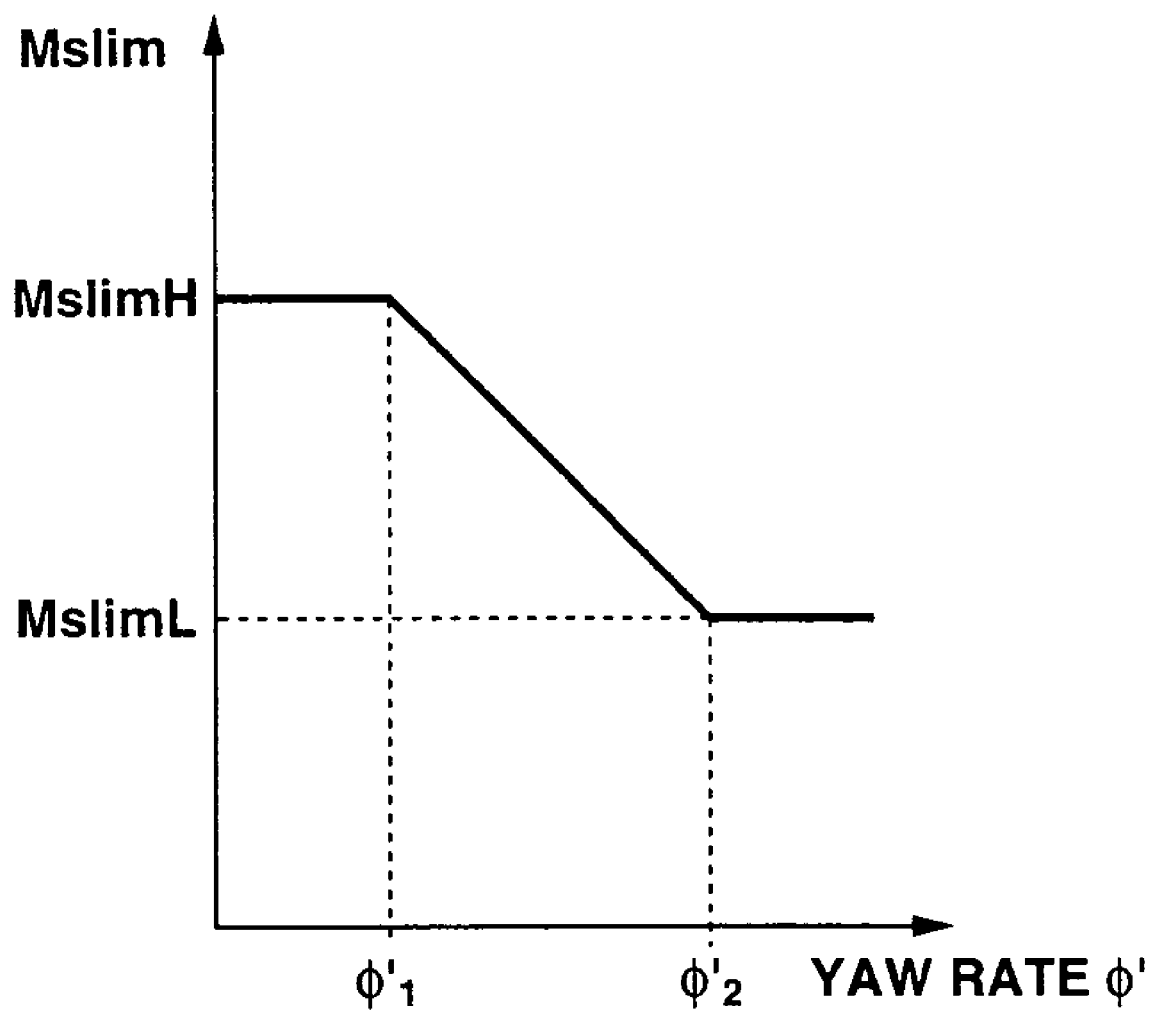
FIG. 11 is a predetermined actual yaw rate $\phi'$ versus yaw-moment controlled variable upper limit Mslim characteristic map.

As can be appreciated from the preprogrammed φ'-Mslim characteristic map of FIG. 11 showing the relationship between actual yaw rate φ' and yaw-moment controlled variable upper limit Mslim, in a low yaw rate range ($0 \leq \phi' \leq \phi_1'$) from 0 to a predetermined low yaw rate $\phi_1'$, yaw-moment controlled variable upper limit Mslim is fixed to a predetermined relatively high yaw-moment controlled variable upper limit MslimH. In a middle and high yaw rate range ($\phi_1' < \phi' \leq \phi_2'$) from the predetermined low yaw rate $\phi_1'$ to a predetermined high yaw rate $\phi_2'$ (higher than $\phi_1'$), yaw-moment controlled variable upper limit Mslim gradually reduces to a predetermined relatively low yaw-moment controlled variable upper limit MslimL, as actual yaw rate φ' increases. In an excessively high yaw rate range ($\phi_2' < \phi'$) above predetermined high yaw rate $\phi_2'$, yaw-moment controlled variable upper limit Mslim is fixed to predetermined relatively low yaw-moment controlled variable upper limit MslimL. In this manner, according to the modified system, yaw-moment controlled variable upper limit Mslim is set or determined based on the host vehicle's turning degree, such as actual yaw rate φ', and then final desired yaw moment Ms can be properly limited depending on the host vehicle's turning degree. Thus, it is possible to produce the controlled yawing moment suited for the host vehicle's turning degree.

In the previously-noted modification, although the host vehicle's turning degree (the degree of yawing motion) is estimated by actual yaw rate φ' detected by yaw rate sensor 16, the host vehicle's turning degree may be estimated or determined based on another quantity of state representative of the turning degree, for example, lateral acceleration Yg exerted on the host vehicle.

Also, it will be appreciated that the fundamental concept of the present invention may be applied to the steering-actuator equipped vehicle dynamics control apparatus shown in FIG. 10 as well as the braking-force-actuator equipped vehicle dynamics control apparatus shown in FIG. 1.

The entire contents of Japanese Patent Application No. 2003-024912 (filed Jan. 31, 2003) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A vehicle dynamics control apparatus comprising:
   at least one sensor configured to detect at least a turning condition and a driving condition of a host vehicle;
   at least one actuator configured to produce a yaw moment acting on the host vehicle; and
   a control unit configured to be electronically connected to the sensors and the actuator, for enabling vehicle dynamics control, which is initiated for dynamic behavior improvement purposes when the host vehicle's dynamic behavior including at least an actual yaw rate exerted on the host vehicle is deteriorated, and lane deviation prevention control, which is initiated for lane deviation avoidance purposes when a lane-deviation estimate corresponding to a future lateral deviation of the host vehicle from a driving lane exceeds a lane-deviation criterion in absence of a driver's intention for lane changing, the control unit comprising:
   (a) a driving stability decision section that determines a driving stability including a vehicle driveability and a vehicle stability, based on at least the turning condition;
   (b) a yawing-motion control section that controls a yawing motion of the host vehicle by producing the yaw moment corresponding to a final desired yaw moment and acting in a direction that improves the driving stability when the driving stability is deteriorated, the final desired yaw moment being determined to be equal to a controlled variable of the lane deviation prevention control when the vehicle dynamics control is inoperative and determined to be equal to a controlled variable of the vehicle dynamics control when the vehicle dynamics control is operative;
   (c) a lane deviation prevention section that determines, based on the driving condition, a lane-deviation tendency of the host vehicle from the driving lane, and executes the lane deviation prevention control by producing the yaw moment corresponding to the controlled variable of the lane deviation prevention control and acting in a direction that lane deviation is prevented; and
   (d) a driving stability decision compensation section that compensates for a decision of the driving stability, based on the controlled variable of the lane deviation prevention control.

2. The vehicle dynamics control apparatus as claimed in claim 1, wherein:
   the driving stability decision section determines the driving stability based on at least one of a yaw-rate deviation between the actual yaw rate resulting from the yaw moment acting on the host vehicle and a final desired yaw rate estimated based on a steer angle and a host vehicle speed, a sideslip angle of the host vehicle, and a rate of change of the sideslip angle.

3. The vehicle dynamics control apparatus as claimed in claim 1, wherein:
   the driving stability decision section determines the driving stability based on at least one of a yaw-rate deviation between the actual yaw rate resulting from the yaw moment acting on a host vehicle and a final desired yaw rate estimated based on a steer angle and a host vehicle speed, a sideslip-angle deviation between an actual sideslip angle of the host vehicle and the desired sideslip angle estimated based on the host vehicle speed, the steer angle, and a road-surface friction coefficient, and a rate of change of the sideslip-angle deviation.

4. The vehicle dynamics control apparatus as claimed in claim 1, wherein:
   the driving stability decision compensation section compensates for the decision of the driving stability by changing a criterion, which is used to determine the driving stability, based on the controlled variable of the lane deviation prevention control, when the lane deviation prevention section is executing the lane deviation prevention control.

5. The vehicle dynamics control apparatus as claimed in claim 1, wherein:
the lane deviation prevention section estimates the lane-deviation estimate corresponding to the future lateral deviation of the host vehicle from the driving lane, based on at least a host vehicle speed, a yaw angle of the host vehicle with respect to a direction of the driving lane, a lateral deviation of the host vehicle from the driving lane, and a curvature of the driving lane, and estimates both of a lane-deviation direction and a possibility of lane deviation, based on a comparison result of the lane-deviation estimate and the lane-deviation criterion, and determines that there is a possibility for the host vehicle to deviate from the driving lane when the lane-deviation estimate exceeds the lane-deviation criterion.

6. The vehicle dynamics control apparatus as claimed in claim 1, wherein:
the yawing-motion control section comprises a braking-and-driving force control section being configured to be electronically connected to the actuator so that braking forces of each of road wheels are automatically controlled independently of each other regardless of a driver's braking action.

7. The vehicle dynamics control apparatus as claimed in claim 1, wherein:
the yawing-motion control section is configured to be electronically connected to the actuator so that the yaw moment is produced in a direction that ensures easy change of vehicle heading when the driving stability decision section determines that the vehicle driveability is deteriorated, and that the yaw moment is produced in a direction that improves the vehicle stability when the driving stability decision section determines that the vehicle stability is deteriorated.

8. The vehicle dynamics control apparatus as claimed in claim 1, wherein:
the lane deviation prevention section estimates the lane-deviation estimate corresponding to the future lateral deviation of the host vehicle from the driving lane, based on at least a host vehicle speed, a yaw angle of the host vehicle with respect to a direction of the driving lane, a lateral deviation of the host vehicle from the driving lane, and a curvature of the driving lane, and calculates a desired yaw moment corresponding to the controlled variable of the lane deviation prevention control, based on a deviation of the lane-deviation estimate and the lane-deviation criterion, and determines a braking force and a driving force of each of the road wheels, based on the desired yaw moment corresponding to the controlled variable of the lane deviation prevention control.

9. A vehicle dynamics control apparatus comprising:
at least one sensor configured to detect at least an actual yaw rate, a yaw angle, a host vehicle speed, and a steer angle;
at least one actuator configured to produce a yaw moment acting on the host vehicle; and
a control unit configured to be electronically connected to the sensors and the actuator, for enabling vehicle dynamics control, which is initiated for dynamic behavior improvement purposes when the host vehicle's dynamic behavior including at least the actual yaw rate exerted on the host vehicle is deteriorated, and lane deviation prevention control, which is initiated for lane deviation avoidance purposes when a lane-deviation estimate corresponding to a future lateral deviation of the host vehicle from a driving lane exceeds a lane-deviation criterion in absence of a driver's intention for lane changing, the control unit comprising:
(a) a desired yaw rate calculation section that calculates a desired yaw rate based on at least the host vehicle speed and the steer angle;
(b) a driving stability decision section that determines a driving stability including a vehicle driveability and a vehicle stability, based on at least a yaw-rate deviation between the actual yaw rate and a final desired yaw rate;
(c) a yawing-motion control section that controls a yawing motion of the host vehicle by producing the yaw moment corresponding to a final desired yaw moment and acting in a direction that improves the driving stability when the driving stability is deteriorated, the final desired yaw moment being determined to be equal to a controlled variable of the lane deviation prevention control when the vehicle dynamics control is inoperative and determined to be equal to a controlled variable of the vehicle dynamics control when the vehicle dynamics control is operative;
(d) a lane deviation prevention section that determines, based on at least the host vehicle speed and the yaw angle, a lane-deviation tendency of the host vehicle from the driving lane, and executes the lane deviation prevention control by producing the yaw moment corresponding to the controlled variable of the lane deviation prevention control and acting in a direction that lane deviation is prevented; and
(e) a desired yaw rate compensation section that compensates for the desired yaw rate based on the controlled variable of the lane deviation prevention control to produce the final desired yaw rate.

10. A vehicle dynamics control apparatus comprising:
at least one sensor configured to detect at least an actual yaw rate, a yaw angle, a host vehicle speed, and a steer angle;
at least one actuator configured to produce a yaw moment acting on the host vehicle; and
a control unit configured to be electronically connected to the sensors and the actuator, for enabling vehicle dynamics control and lane deviation prevention control, the control unit comprising:
(a) a lane deviation prevention section that determines, based on at least the host vehicle speed and the yaw angle, a lane-deviation tendency of the host vehicle from a driving lane, and executes the lane deviation prevention control by producing the yaw moment corresponding to a controlled variable of the lane deviation prevention control and acting in a direction that lane deviation is prevented;
(b) an equivalent steer angle calculation section that calculates an equivalent steer angle equivalent to the controlled variable of the lane deviation prevention control;
(c) a steer-angle correction value calculation section that calculates a steer-angle correction value by adding the equivalent steer angle to the steer angle;
(d) a desired yaw rate calculation section that calculates a final desired yaw rate based on the steer-angle correction value;

(e) a driving stability decision section that determines a driving stability including a vehicle driveability and a vehicle stability, based on at least a yaw-rate deviation between the actual yaw rate and the final desired yaw rate; and (f) a yawing-motion control section that controls a yawing motion of the host vehicle by producing the yaw moment corresponding to a final desired yaw moment and acting in a direction that improves the driving stability when the driving stability is deteriorated, the final desired yaw moment being determined to be equal to the controlled variable of the lane deviation prevention control when the vehicle dynamics control is inoperative and determined to be equal to a controlled variable of the vehicle dynamics control when the vehicle dynamics control is operative.

11. A vehicle dynamics control apparatus comprising:

at least one sensor configured to detect at least a turning condition and a driving condition of a host vehicle;

at least one actuator configured to produce a yaw moment acting on the host vehicle; and a control unit configured to be electronically connected to the sensors and the actuator, for enabling vehicle dynamics control and lane deviation prevention control, the control unit comprising a processor programmed to perform the following, (a) determining a driving stability including a vehicle driveability and a vehicle stability, based on at least the turning condition;

(b) executing the vehicle dynamics control by producing the yaw moment corresponding to a controlled variable of the vehicle dynamics control that improves the driving stability when the driving stability is deteriorated;

(c) executing the lane deviation prevention control by producing the yaw moment corresponding to a controlled variable of the lane deviation prevention control that acts to prevent lane deviation; and (d) compensating for a driving-stability criterion, which is used to determine execution of the vehicle dynamics control, based on the controlled variable of the lane deviation prevention control so as to hold the vehicle dynamics control inoperative, when the vehicle dynamics control is inoperative.

12. The vehicle dynamics control apparatus as claimed in claim 11, wherein the processor is further programmed for:

(e) estimating a yaw-rate deviation between an actual yaw rate resulting from the yaw moment acting on the host vehicle and a final desired yaw rate estimated based on a steer angle and a host vehicle speed;

(f) comparing the yaw-rate deviation to a yaw-rate-deviation threshold value; and (g) initiating the vehicle dynamics control when the yaw-rate deviation exceeds the yaw-rate-deviation threshold value; and wherein compensating for the driving-stability criterion is achieved by decreasing the yaw-rate deviation based on the controlled variable of the lane deviation prevention control.

13. The vehicle dynamics control apparatus as claimed in claim 11, wherein the processor is further programmed for:

(e) estimating a yaw-rate deviation between an actual yaw rate resulting from the yaw moment acting on the host vehicle and a final desired yaw rate estimated based on a steer angle and a host vehicle speed;

(f) comparing the yaw-rate deviation to a yaw-rate-deviation threshold value; and (g) initiating the vehicle dynamics control when the yaw-rate deviation exceeds the yaw-rate-deviation threshold value; and wherein compensating for the driving-stability criterion is achieved by increasing the yaw-rate-deviation threshold value based on the controlled variable of the lane deviation prevention control.

14. The vehicle dynamics control apparatus as claimed in claim 13, wherein:

the yaw-rate-deviation threshold value is fixed to a predetermined low threshold value in a small desired yaw moment range less than or equal to a predetermined small controlled variable, and gradually increases to a predetermined high threshold value as the controlled variable of the lane deviation prevention control increases in a middle and high desired yaw moment range from the predetermined small controlled variable to a predetermined high controlled variable, and is fixed to the predetermined high threshold value in an excessively high desired yaw moment range above the predetermined high controlled variable.

15. The vehicle dynamics control apparatus as claimed in claim 11, wherein the processor is further programmed for:

(e) calculating a desired yaw rate based on at least the host vehicle speed and the steer angle; and wherein compensating for the driving-stability criterion is achieved by compensating for the desired yaw rate based on the controlled variable of the lane deviation prevention control to produce the final desired yaw rate and by compensating for the yaw-rate deviation between the final desired yaw rate and the actual yaw rate resulting from the yaw moment acting on the host vehicle.

16. The vehicle dynamics control apparatus as claimed in claim 11, wherein the processor is further programmed for:

(e) calculating an equivalent steer angle equivalent to the controlled variable of the lane deviation prevention control; and wherein compensating for the driving-stability criterion is achieved by calculating a steer-angle correction value as a sum of the equivalent steer angle and the steer angle, and by calculating the final desired yaw rate based on the steer-angle correction value, and by compensating for the yaw-rate deviation between the final desired yaw rate and the actual yaw rate resulting from the yaw moment acting on the host vehicle.

17. A method of balancing a vehicle dynamics control system and a lane deviation prevention control system, the method comprising:

detecting at least a turning condition and a driving condition of a host vehicle;

determining a driving stability including a vehicle driveability and a vehicle stability, based on at least the turning condition;

controlling a yawing motion of the host vehicle by producing a yaw moment corresponding to a final desired yaw moment and acting on the host vehicle in a direction that improves the driving stability when the driving stability is deteriorated;

selecting a controlled variable of lane deviation prevention control, which is initiated for lane deviation avoidance purposes when a lane-deviation estimate corresponding to a future lateral deviation of the host vehicle from a driving lane exceeds a lane-deviation criterion in absence of a driver's intention for lane changing, as the final desired yaw moment when vehicle dynamics control is inoperative;

selecting a controlled variable of vehicle dynamics control, which is initiated for dynamic behavior improvement purposes when the host vehicle's dynamic behavior including at least the actual yaw rate exerted on the host vehicle is deteriorated, as the final desired yaw moment when the vehicle dynamics control is operative;

determining, based on the driving condition, a lane-deviation tendency of the host vehicle from the driving lane;

executing the lane deviation prevention control by producing a yaw moment corresponding to the controlled variable of the lane deviation prevention control and acting on the host vehicle in a direction that lane deviation is prevented; and compensating for a decision of the driving stability, based on the controlled variable of the lane deviation prevention control.

18. A method of balancing a vehicle dynamics control system and a lane deviation prevention control system, the method comprising:

detecting at least a turning condition and a driving condition of a host vehicle;

determining a driving stability including a vehicle driveability and a vehicle stability, based on at least the turning condition;

executing vehicle dynamics control by producing a yaw moment corresponding to a controlled variable of the vehicle dynamics control that improves the driving stability when the driving stability is deteriorated;

executing lane deviation prevention control by producing a yaw moment corresponding to a controlled variable of the lane deviation prevention control that acts to prevent lane deviation; and compensating for a driving-stability criterion, which is used to determine execution of the vehicle dynamics control, based on the controlled variable of the lane deviation prevention control so as to hold the vehicle dynamics control inoperative, when the vehicle dynamics control is inoperative.

19. The method as claimed in claim 18, further comprising:

estimating a yaw-rate deviation between an actual yaw rate resulting from the yaw moment acting on the host vehicle and a final desired yaw rate estimated based on a steer angle and a host vehicle speed;

comparing the yaw-rate deviation to a yaw-rate-deviation threshold value; and initiating the vehicle dynamics control when the yaw-rate deviation exceeds the yaw-rate-deviation threshold value; and wherein compensating for the driving-stability criterion is achieved by decreasing the yaw-rate deviation based on the controlled variable of the lane deviation prevention control.

20. The method as claimed in claim 18, further comprising:

estimating a yaw-rate deviation between an actual yaw rate resulting from the yaw moment acting on the host vehicle and a final desired yaw rate estimated based on a steer angle and a host vehicle speed;

comparing the yaw-rate deviation to a yaw-rate-deviation threshold value; and initiating the vehicle dynamics control when the yaw-rate deviation exceeds the yaw-rate-deviation threshold value; and wherein compensating for the driving-stability criterion is achieved by increasing the yaw-rate-deviation threshold value based on the controlled variable of the lane deviation prevention control.

21. The method as claimed in claim 18, further comprising:

calculating a desired yaw rate based on at least the host vehicle speed and the steer angle; and wherein compensating for the driving-stability criterion is achieved by compensating for the desired yaw rate based on the controlled variable of the lane deviation prevention control to produce the final desired yaw rate and by compensating for the yaw-rate deviation between the final desired yaw rate and the actual yaw rate resulting from the yaw moment acting on the host vehicle.

22. The method as claimed in claim 18, further comprising:

calculating an equivalent steer angle equivalent to the controlled variable of the lane deviation prevention control; and wherein compensating for the driving-stability criterion is achieved by calculating a steer-angle correction value as a sum of the equivalent steer angle and the steer angle, and by calculating the final desired yaw rate based on the steer-angle correction value, and by compensating for the yaw-rate deviation between the final desired yaw rate and the actual yaw rate resulting from the yaw moment acting on the host vehicle.

23. A vehicle dynamics control apparatus comprising:

sensor means for detecting at least a turning condition and a driving condition of a host vehicle;

actuating means for producing a yaw moment acting on the host vehicle; and a control unit configured to be electronically connected to the sensor means and the actuating means, for enabling vehicle dynamics control, which is initiated for dynamic behavior improvement purposes when the host vehicle's dynamic behavior including at least an actual yaw rate exerted on the host vehicle is deteriorated, and lane deviation prevention control, which is initiated for lane deviation avoidance purposes when a lane-deviation estimate corresponding to a future lateral deviation of the host vehicle from a driving lane exceeds a lane-deviation criterion in absence of a driver's intention for lane changing, the control unit comprising:

(a) a driving stability decision means for determining a driving stability including a vehicle driveability and a vehicle stability, based on at least the turning condition;

(b) a yawing-motion control means for controlling a yawing motion of the host vehicle by producing the yaw moment corresponding to a final desired yaw moment and acting in a direction that improves the driving stability when the driving stability is deteriorated, the final desired yaw moment being determined to be equal to a controlled variable of the lane deviation prevention control when the vehicle dynamics control is inoperative and determined to be equal to a controlled variable of the vehicle dynamics control when the vehicle dynamics control is operative;

(c) a lane deviation prevention means for determining, based on the driving condition, a lane-deviation tendency of the host vehicle from a driving lane, and executes the lane deviation prevention control by producing the yaw moment corresponding to the controlled variable of the lane deviation prevention control and acting in a direction that lane deviation is prevented; and (d) a driving stability decision compensation means for compensating for a decision of the driving stability, based on the controlled variable of the lane deviation prevention control.

24. A vehicle dynamics control apparatus comprising:

sensor means for detecting at least a turning condition and a driving condition of a host vehicle;

actuating means for producing a yaw moment acting on the host vehicle; and control means configured to be electronically connected to the sensor means and the actuating means, for enabling vehicle dynamics control and lane deviation prevention control, the control means comprising a processor programmed to perform the following, (a) determining a driving stability including a vehicle driveability and a vehicle stability, based on at least the turning condition;

(b) executing the vehicle dynamics control by producing the yaw moment corresponding to a controlled variable of the vehicle dynamics control that improves the driving stability when the driving stability is deteriorated;

(c) executing the lane deviation prevention control by producing the yaw moment corresponding to a controlled variable of the lane deviation prevention control that acts to prevent lane deviation; and (d) compensating for a driving-stability criterion, which is used to determine execution of the vehicle dynamics control, based on the controlled variable of the lane deviation prevention control so as to hold the vehicle dynamics control inoperative, when the vehicle dynamics control is inoperative.

* * * * *